United States Patent
Zhang

(10) Patent No.: US 11,375,227 B2
(45) Date of Patent: Jun. 28, 2022

(54) VIDEO MOTION ESTIMATION METHOD AND APPARATUS, AND STORAGE MEDIUM

(71) Applicant: Tencent Technology (Shenzhen) Company Limited, Shenzhen (CN)

(72) Inventor: Hongshun Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 183 days.

(21) Appl. No.: 16/910,938

(22) Filed: Jun. 24, 2020

(65) Prior Publication Data

US 2020/0322624 A1 Oct. 8, 2020

Related U.S. Application Data

(63) Continuation of application No. PCT/CN2019/075548, filed on Feb. 20, 2019.

(30) Foreign Application Priority Data

Mar. 7, 2018 (CN) .......................... 201810188556.6

(51) Int. Cl.
*H04N 19/513* (2014.01)
*H04N 19/57* (2014.01)
(Continued)

(52) U.S. Cl.
CPC ......... *H04N 19/513* (2014.11); *H04N 19/119* (2014.11); *H04N 19/147* (2014.11); *H04N 19/176* (2014.11); *H04N 19/57* (2014.11)

(58) Field of Classification Search
CPC combination set(s) only.
See application file for complete search history.

(56) References Cited

U.S. PATENT DOCUMENTS 9,712,826 B2 * 7/2017 Senzaki ................. H04N 19/61
11,245,912 B2 * 2/2022 Kim ..................... H04N 19/192
(Continued)

FOREIGN PATENT DOCUMENTS

CN 101494757 A 7/2009
CN 101754022 A 6/2010
(Continued)

OTHER PUBLICATIONS

Japanese Office Action dated Sep. 24, 2021 in Japanese Application No. 2020-540622 (with Computer Generated English Translation).
(Continued)

*Primary Examiner* — Joon Kwon
(74) *Attorney, Agent, or Firm* — ArentFox Schiff LLP

(57) ABSTRACT

A terminal performs video estimation by dividing an image frame of a video into a plurality of prediction units, and dividing the plurality of prediction units into a first type of prediction units and a second type of prediction units. A motion vector of a prediction unit of the first type is then obtained according to a first search algorithm. A motion vector of a prediction unit of the second type is obtained according to a second search algorithm. The second search algorithm is different from the first search algorithm. Then sub-pixel motion estimation is performed on the image frame according to the motion vector of the prediction unit of the first type and the motion vector of the prediction unit of the second type to generate a motion estimate result.

20 Claims, 11 Drawing Sheets

(51) Int. Cl.
*H04N 19/119* (2014.01)
*H04N 19/147* (2014.01)
*H04N 19/176* (2014.01)

(56) References Cited

U.S. PATENT DOCUMENTS

| | | | |
|---|---|---|---|
| 2005/0276323 A1* | 12/2005 | Martemyanov | H03M 7/4006 375/E7.262 |
| 2012/0300850 A1* | 11/2012 | Yie | H04N 19/44 375/E7.256 |
| 2013/0016787 A1* | 1/2013 | Kim | H04N 19/51 375/E7.123 |
| 2013/0336397 A1* | 12/2013 | Senzaki | H04N 19/44 375/240.12 |
| 2015/0078451 A1 | 3/2015 | Tourapis et al. | |
| 2016/0021385 A1 | 1/2016 | Chou et al. | |
| 2017/0257631 A1* | 9/2017 | Takano | H04N 19/119 |

FOREIGN PATENT DOCUMENTS

| | | |
|---|---|---|
| CN | 102170567 A | 8/2011 |
| CN | 107135392 A | 9/2017 |

OTHER PUBLICATIONS

Xiaoquan Yi et al. "Improved and simplified fast motion estimation for JM", Joint Video Team (JVT) of ISO/IEC MPEG & ITU-T VCEG, 16th Meeting, Jul. 24-29, 2005, 12 pages.

Zhibo Chen, et al. "Fast Integer Pel and Fractional Pel Motion Estimation for JVT", Joint Video Team (JVT) of ISO/IEC MPEG & ITU-T VCEG, 6th Meeting, Dec. 5-13, 2002. 14 pages.

Extended European Search Report dated Apr. 12, 2021 in European Application No. 19764644.1.

Communication Pursuant to Rules 70(2) and 70a(2) EPC dated Apr. 30, 2021 in European Application No. 19764644.1.

Anonymous Ed—Dari Kuhn "Motion Vector Grouping for Search Position Reduction in Hierarchical Video Motion Estimators", IP.Com, Oct. 26, 2004, XP013021906, 3 pages.

K. Singh et al. "A New Motion Estimation Algorithm for High Efficient Video Coding Standard", 2015 Annual IEEE India Conference, Dec. 17, 2015, XP032887725, 5 pages.

International Search Report dated May 9, 2019 in International Application No. PCT/CN2019/075548, with English translation, 11 pages.

Jiang, et al. ; Fast Intra Coding Algorithm Using Smooth Region Detection for HEVC; Journal of Xidian University, vol. 40, No. 03, Jun. 20, 2013 ; pp. 194-200 ; Abstract Only ; 2 Pages.

* cited by examiner

VIDEO MOTION ESTIMATION METHOD AND APPARATUS, AND STORAGE MEDIUM

RELATED APPLICATION

This application is a continuation of International Application No. PCT/CN2019/075548, filed on Feb. 20, 2019, which claims priority to Chinese Patent Application No. 201810188556.6, filed on Mar. 7, 2018, and entitled "VIDEO MOTION ESTIMATION METHOD AND APPARATUS, AND STORAGE MEDIUM". The entire disclosures of the prior applications are hereby incorporated by reference in their entirety.

FIELD OF THE TECHNOLOGY

The present disclosure relates to video compression, such as a video motion estimation.

BACKGROUND OF THE DISCLOSURE

In the process of encoding a video, inter-frame prediction is performed on each frame of image in the video. The inter-frame prediction predicts a pixel of the current image using a time-domain correlation of the video and using a pixel of an adjacent encoded image, so that the time domain of the video is not redundant. Typically, the inter-frame prediction part of video encoding uses block-based motion compensation. In block-based motion compensation, an optimal matching block in the previously encoded image is found for each pixel block (that is, a prediction unit) of the current image. This process is referred to as motion estimation (ME). An image used for prediction is referred to as a reference image, and displacement of a reference block in the reference image to the current pixel block in the current image is referred to as a motion vector (MV).

In the related art, in the process of performing motion estimation on image frames in the video, the image frames are first divided into prediction units of modes such as 2N×2N, 2N×N, N×2N, 2N×nU, 2N×nD, nL×2N, nR×2N, or the like, through an inter-frame prediction unit (PU). Then, a unified processing method is adopted for all prediction units. After a starting search point of each prediction unit is determined, the starting search point is used as the center, and a point with minimum rate-distortion cost is found within the search range. Finally, a location of the point with the minimum rate-distortion cost of each prediction unit is used as a motion vector corresponding to each prediction unit, and subsequent operations such as sub-pixel motion compensation are performed on the image frame according to the motion vector corresponding to each prediction unit.

During the research and practice of the related art, the inventor of this application found that, because the same processing method is uniformly used for all prediction units in the related art, a new independent search is performed on each prediction unit. For example, for all the prediction units, the search method with the same complexity is used, causing an inflexible process of performing motion estimation on the video and low efficiency of motion estimation.

SUMMARY

According to exemplary embodiments of the present disclosure, the following video motion estimation methods and apparatuses are provided.

In an exemplary aspect, a video motion estimation method, performed by a terminal, includes the following steps. An image frame of a video is divided into a plurality of prediction units, and the plurality of prediction units are divided into a first type of prediction units and a second type of prediction units. A motion vector a motion vector of a prediction unit of the first type is then obtained according to a first search algorithm, and a motion vector of a prediction unit of the second type is obtained according to a second search algorithm. The second search algorithm is different from the first search algorithm. Then sub-pixel motion estimation is performed on the image frame according to the motion vector of the prediction unit of the first type and the motion vector of the prediction unit of the second type.

In an exemplary aspect, in the obtaining of the motion vector of the prediction unit of the second type according to a second search algorithm, a polygonal model is obtained according to the second search algorithm, and a current motion vector of prediction unit of the the second type is obtained by moving the polygonal model. A motion vector of a searched prediction unit in the image frame is obtained, and the current motion vector is corrected according to the motion vector of the searched prediction unit, to obtain the motion vector of the prediction unit of the second type.

In an exemplary aspect, in the obtaining of the polygonal model according to the second search algorithm, a first undetermined point in the second type of prediction unit is obtained according to the second search algorithm, and a polygonal model centered on the first undetermined point is obtained. A first target point is obtained according to the polygonal model in a case that a search step size of the first undetermined point is within a first preset step size threshold range. A location of the first target point is set as the current motion vector of the prediction unit of the second type in a case that the first target point is consistent with the first undetermined point, and the polygonal model is moved and an optimal point is obtained according to the moved polygonal model in a case that the first target point is inconsistent with the first undetermined point. A location of the optimal point is set as the current motion vector of the prediction unit of the second type in a case that the optimal point is consistent with the first target point.

In an exemplary aspect, in the moving of the polygonal model, a center of the polygonal model is moved to a location of the first target point in a case that the first target point is inconsistent with the first undetermined point, and a point with minimum rate-distortion cost from the center of the moved polygonal model and each vertex is selected to obtain the optimal point.

In an exemplary aspect, in the obtaining of the first undetermined point, the minimum rate-distortion cost in the prediction unit of the second type is obtained according to the second search algorithm, to obtain the first undetermined point, and the polygonal model centered on the first undetermined point is obtained in a case that a search step size corresponding to the first undetermined point is within the first preset step size threshold range. A point with the minimum rate-distortion cost from a midpoint of the polygonal model and each vertex is selected to obtain the first target point.

In an exemplary aspect, in the obtaining of the point with the minimum rate-distortion cost in the prediction unit of the second type, a first candidate starting search point corresponding to the prediction unit of the second type is obtained according to the second search algorithm, and a rate-distortion cost of each first candidate starting search point is calculated, and the first candidate starting search point with the minimum rate-distortion cost is set as a first starting search point. A plurality of first candidate points within a search window range centered on the first starting search point is obtained according to a first preset increasing step size. A point with minimum rate-distortion cost from the plurality of first candidate points is selected to obtain the first undetermined point.

In an exemplary aspect, the prediction unit of the second type includes a first dividing block and a second dividing block, and in the obtaining of the first candidate starting search point, a first candidate starting search point corresponding to the second dividing block in the prediction unit of the second typet is obtained through advanced motion vector prediction according to the second search algorithm. A prediction result of the first dividing block is obtained, a rate-distortion cost of each first candidate starting search point is calculated, and a rate-distortion cost of a location of the first dividing block is calculated according to the prediction result of the first dividing block in a case that the first dividing block in the prediction unit of the second type is predicted. The point with the minimum rate-distortion cost from the first candidate starting search point and the first dividing block is obtained. The obtained point with the minimum rate-distortion cost is set as the starting search point of the second dividing block in the prediction unit of the second type, and the starting search point of the second dividing block is set as the first starting search point.

In an exemplary aspect, after the obtaining of the point with the minimum rate-distortion cost in the prediction unit of the second type, a first supplementary point not searched around each point corresponding to the first preset step size is obtained, and a rate-distortion cost of the first supplementary point is calculated in a case that the search step size corresponding to the first undetermined point is a first preset step size. A location of the first undetermined point is set as a current motion vector of the prediction unit of the second type in a case that the point with the minimum rate-distortion cost in the first undetermined point and the first supplementary point is the first undetermined point. A location of the point with the minimum rate-distortion cost in the first undetermined point and the first supplementary point is set as a current motion vector of the prediction unit of the second type in a case that the point with the minimum rate-distortion cost in the first undetermined point and the first supplementary point is not the first undetermined point.

In an exemplary aspect, after the obtaining of the point with the minimum rate-distortion cost in the prediction unit of the second type, the first undetermined point is set as a first starting search point, and the operation of obtaining is performed, according to a first preset increasing step size, on a plurality of first candidate points within a search window range centered on the first starting search point in a case that the search step size corresponding to the first undetermined point is within a second preset step size threshold range.

In an exemplary aspect, in the obtaining of the motion vector of a searched prediction unit in the image frame, the motion vector of the searched prediction unit in the image frame is obtained, and a first target rate-distortion cost of a corresponding location of the prediction unit of the second type according to the motion vector of the searched prediction unit is calculated. A current rate-distortion cost of the prediction unit of the second type is determined according to the current motion vector of the prediction unit of the second type. The current rate-distortion cost of the prediction unit of the second type is compared to the first target rate-distortion cost. The motion vector of the searched prediction unit is set as the motion vector of the prediction unit of the second type in a case that the current rate-distortion cost of the prediction unit of the second type is greater than the first target rate-distortion cost. A location of a point corresponding to the current rate-distortion cost is set as the motion vector of the prediction unit of the second type in a case that the current rate-distortion cost of the prediction unit of the second type is less than or equal to the first target rate-distortion cost.

In an exemplary aspect, in the operation of obtaining a motion vector of the prediction unit of the first type according to a first search algorithm, a second candidate starting search point corresponding to the prediction unit of the first type is obtained, a rate-distortion cost of each second candidate starting search point is calculated, and a second candidate starting search point with the minimum rate-distortion cost is set as a second starting search point. A plurality of second candidate points within the search window range centered on the second starting search point is obtained according to the second preset increasing step size, the rate-distortion cost of each second candidate point is calculated, and the point with the minimum rate-distortion cost from the plurality of second candidate points is set to obtain a second undetermined point. A second supplementary point not searched around each point corresponding to the second preset step size is obtained, and a rate-distortion cost of the second supplementary point is calculated in a case that the search step size corresponding to the second undetermined point is a second preset step size. A location of the second undetermined point is set as the motion vector of the prediction unit of the first type in a case that a point with minimum rate-distortion cost in the second undetermined point and the second supplementary point is the second undetermined point. A location of the point with the minimum rate-distortion cost in the second undetermined point and the second supplementary point is set as the motion vector of the prediction unit of the first type in a case that the point with the minimum rate-distortion cost in the second undetermined point and the second supplementary point is not the second undetermined point.

In an exemplary aspect, in the operation of setting the location of the second undetermined point as the motion vector of the prediction unit of the first type, the motion vector of the searched prediction unit in the image frame is obtained, and a second target rate-distortion cost of a corresponding location of the prediction unit of the first type is calculated according to the motion vector of the searched prediction unit. A rate-distortion cost of the second undetermined point is compared to the second target rate-distortion cost. The motion vector of the searched prediction unit is set as the motion vector of the prediction unit of the first type in a case that the rate-distortion cost of the second undetermined point is greater than the second target rate-distortion cost. The location of the second undetermined point is set as the motion vector of the prediction unit of the first type in a case that the rate-distortion cost of the second undetermined point is less than or equal to the second target rate-distortion cost.

In an exemplary aspect, the prediction unit of the first type includes a third dividing block and a fourth dividing block, and in the operation of obtaining a second candidate starting search point corresponding to the prediction unit of the first type, a second candidate starting search point corresponding to the fourth dividing block in the prediction unit of the first type through advanced motion vector prediction is obtained. A prediction result of the third dividing block is obtained, a rate-distortion cost of each second candidate starting search point is calculated, and a rate-distortion cost of a location of the third dividing block is calculated according to the prediction result of the third dividing block in a case that the third dividing block in the prediction unit of the first type is predicted. The point with the minimum rate-distortion cost is set as the starting search point of the fourth dividing block in the prediction unit of the first type from the second candidate starting search point and the third dividing block, and the starting search point of the fourth dividing block is set as the second starting search point.

In an exemplary aspect, a video motion estimation apparatus includes circuitry that divides an image frame of a video into a plurality of prediction units, and divides the plurality of prediction units into a first type of prediction units and a second type of prediction units. The circuitry obtains a motion vector of a prediction unit of the first type according to a first search algorithm, and obtains a motion vector of the prediction unit of the second type according to a second search algorithm. The second search algorithm is different from the first search algorithm. The circuitry performs sub-pixel motion estimation on the image frame according to the motion vector of them prediction unit of the first type and the motion vector of the prediction unit of the second type to generate a motion estimate result.

In an exemplary aspect, in the obtaining the motion vector of the prediction unit of the second type, the circuitry obtains a polygonal model according to the second search algorithm, and obtains a current motion vector of the prediction unit of the second type by moving the polygonal model. The circuitry obtains a motion vector of a searched prediction unit in the image frame, and corrects the current motion vector according to the motion vector of the searched prediction unit, to obtain the motion vector of the prediction unit of the second type.

In an exemplary aspect, in the obtaining of the motion vector of the prediction unit of the first type, the circuitry obtains a first undetermined point in the prediction unit of the second type according to the second search algorithm, and obtains a polygonal model centered on the first undetermined point, and obtain a first target point according to the polygonal model in a case that a search step size of the first undetermined point is within a first preset step size threshold range. The circuitry moves the polygonal model, and obtains an optimal point according to the moved polygonal model in a case that the first target point is inconsistent with the first undetermined point. The circuitry sets a location of the optimal point as the current motion vector of the prediction unit of the second type in a case that the optimal point is consistent with the first target point.

In an exemplary aspect, in the obtaining of the motion vector of the prediction unit of the first type, the circuitry obtains a second candidate starting search point corresponding to the prediction unit of the first type, calculates a rate-distortion cost of each second candidate starting search point, and sets a second candidate starting search point with the minimum rate-distortion cost as a second starting search point. The circuitry obtains, according to the second preset increasing step size, a plurality of second candidate points within the search window range centered on the second starting search point, calculates rate-distortion cost of each second candidate point, and selects a point with the minimum rate-distortion cost from the plurality of second candidate points, to obtain a second undetermined point. The circuitry obtains a second supplementary point not searched around each point corresponding to the second preset step size, and calculates rate-distortion cost of the second supplementary point in a case that the search step size corresponding to the second undetermined point is a second preset step size. The circuitry sets a location of the second undetermined point as the motion vector of the prediction unit of the first type in a case that the point with the minimum rate-distortion cost in the second undetermined point and the second supplementary point is the second undetermined point. The circuitry sets the second undetermined point as the second starting search point in a case that the point with the minimum rate-distortion cost in the second undetermined point and the second supplementary point is not the second undetermined point.

In an exemplary aspect, in the obtaining of the motion vector of the prediction unit of the first type, the circuitry performs searching, according to a preset interval step size, within a preset range centered on the second undetermined point in a case that the search step size corresponding to the second undetermined point is within a third preset step size threshold range, to obtain a plurality of search points, and calculates rate-distortion cost of each search point. The circuitry uses the point with the minimum rate-distortion cost in the second undetermined point and the plurality of search points as the second starting search point.

In an exemplary aspect, a video motion estimation system includes a server that stores video, and a terminal including circuitry that receives the video from the server. The circuitry divides an image frame of the video into a plurality of prediction units, and divides the plurality of prediction units into a first type of prediction units and a second type of prediction units. The circuitry obtains a motion vector of a prediction unit of the first type according to a first search algorithm, and obtains a motion vector of a prediction unit of the second type according to a second search algorithm. The second search algorithm is different from the first search algorithm. The circuitry performs sub-pixel motion estimation on the image frame according to the motion vector of the prediction unit of the first type and the motion vector of the prediction unit of the second type.

In an exemplary aspect, a non-transitory computer-readable medium storing computer-readable instructions that, when executed by a processor, cause the processor to perform the following method. An image frame of a video is divided into a plurality of prediction units, and the plurality of prediction units are divided into a first type of prediction units and a second type of prediction units. A motion vector of a prediction unit of the first type is obtained according to a first search algorithm, and a motion vector of a prediction unit of the second type is obtained according to a second search algorithm. The second search algorithm is different from the first search algorithm. Sub-pixel motion estimation is performed on the image frame according to the motion vector of the prediction unit of the first type and the motion vector of the prediction unit of the second type.

BRIEF DESCRIPTION OF THE DRAWINGS

To describe the technical solutions of the exemplary embodiments of the present disclosure more clearly, the following briefly introduces the accompanying drawings. As can be appreciated, the accompanying drawings in the following description show exemplary embodiments of this application, but they are not exhaustive of all possible embodiments. A person of ordinary skill in the art will recognize that other embodiments not illustrated in the accompanying drawings are possible without departing from the scope of the present disclosure.

DETAILED DESCRIPTION

Hereinafter, the exemplary embodiments of the present disclosure are described in connection with the drawings. The following descriptions are merely exemplary and not limiting upon the present disclosure, and other embodiments are possible without departing from the scope of the present disclosure.

Exemplary embodiments of the present disclosure provide a video motion estimation method, apparatus, and system.

Figure 1:
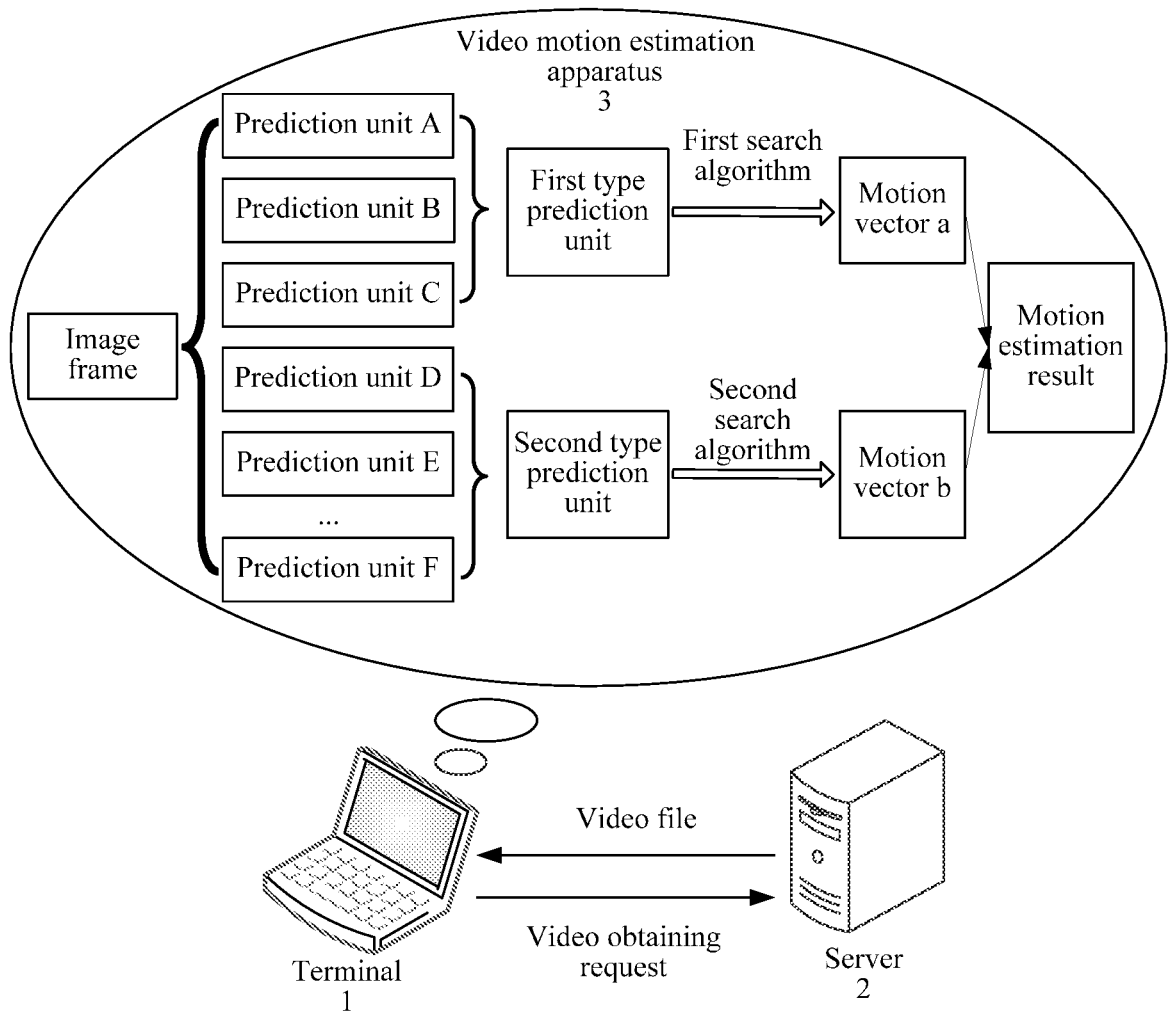
FIG. 1 is a schematic diagram of a scenario of a video motion estimation system according to an exemplary embodiment of the present disclosure.

FIG. 1 is a schematic diagram of a scenario of a video motion estimation system according to an exemplary embodiment of the present disclosure. The video motion estimation system may include a video motion estimation apparatus 3. The video motion estimation apparatus 3 may be specifically integrated into a terminal 1 such as a tablet computer, a mobile phone, a notebook computer, a desktop computer, a television, or the like that has a storage unit, is equipped with circuitry such as a microprocessor, and has computing capability, which is configured to divide image frames in a video into a plurality of prediction units, and divide the plurality of prediction units into a first type of prediction unit and a second type of prediction unit. The video may be obtained locally from the terminal 1 or downloaded from a server 2. The prediction unit may include a plurality of prediction units such as a prediction unit A, a prediction unit B, a prediction unit C, a prediction unit D, a prediction unit E, a prediction unit F, and the like. The first type of prediction unit may include a plurality of prediction units such as a prediction unit A, a prediction unit B, a prediction unit C, and the like. The second type of prediction unit may include a plurality of prediction units such as a prediction unit D, a prediction unit E, a prediction unit F, and the like. A motion vector of the first type of prediction unit is obtained according to a first search algorithm, and a motion vector of the second type of prediction unit is obtained according to a second search algorithm. In the process of obtaining the motion vector of the second type of prediction unit according to the second search algorithm, a polygonal model may be obtained, and a current motion vector of the second type of prediction unit may be obtained by moving the polygonal model. The polygonal model may be a diamond model or a hexagonal model. After a motion vector a of the first type of prediction unit and a motion vector b of the second type of prediction unit are obtained, a motion vector of the searched prediction unit in an image frame may be obtained, and the current motion vector may be corrected according to the motion vector of the searched prediction unit, to obtain a motion vector of the second type of prediction unit. The searched prediction unit may include the second type of prediction unit and at least one prediction unit of the second type of prediction unit. Then, sub-pixel motion estimation is performed on the image frame according to the motion vector of the first type of prediction unit and the motion vector of the second type of prediction unit, to obtain a motion estimation result, and so on.

In addition, the video motion estimation system may further include a server, and the video motion estimation apparatus may download the video from the server. For example, the video motion estimation apparatus may send a video acquisition request to the server, and receive a video file corresponding to the video fed back by the server based on the video acquisition request.

The schematic diagram of the scenario of the video motion estimation system shown in FIG. 1 is only an example. The video motion estimation system and scenario described in the exemplary embodiments of the present disclosure are intended to describe the technical solutions in the exemplary embodiments of the present disclosure more clearly, and do not constitute a limitation on the technical solutions provided in the exemplary embodiments of the present disclosure. A person skilled in the art will recognize that, with the evolution of the video motion estimation system and emergence of new business scenarios, the technical solutions provided in the exemplary embodiments of the present disclosure are also applicable to similar technical problems, and that other embodiments are possible without departing from the scope of the present disclosure.

In an exemplary embodiment, a video motion estimation apparatus 3 is described. The video motion estimation apparatus may be integrated in a terminal 1 such as a computer, a mobile phone, a television, or the like that has a storage unit, is equipped with circuitry such as a microprocessor, and has computing capability.

A video motion estimation method, includes dividing image frames in a video into a plurality of prediction units, and dividing the plurality of prediction units into a first type of prediction unit and a second type of prediction unit; obtaining a motion vector of the first type of prediction unit according to a first search algorithm, and obtaining a motion vector of the second type of prediction unit according to a second search algorithm; and performing sub-pixel motion estimation on the image frame according to the motion vector of the first type of prediction unit and the motion vector of the second type of prediction unit.

Figure 2:
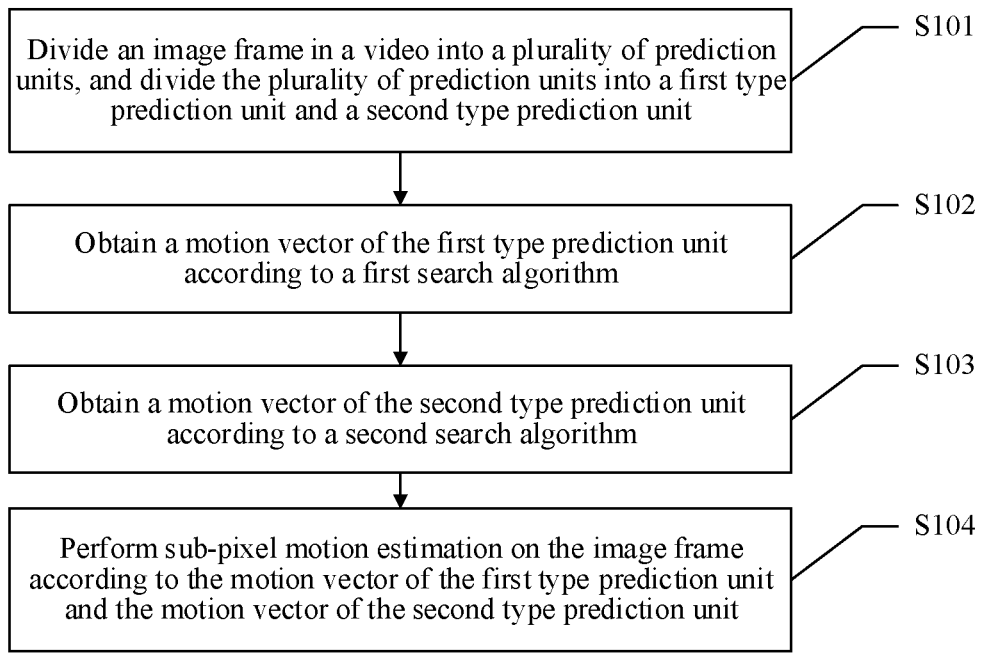
FIG. 2 is a schematic flowchart of a video motion estimation method according to an exemplary embodiment of the present disclosure.

FIG. 2 is a schematic flowchart of a video motion estimation method according to a first exemplary embodiment of the present disclosure. The video motion estimation method may include the following operations.

In step S101, image frames in a video are divided into a plurality of prediction units, and the plurality of prediction units are divided into a first type of prediction unit and a second type of prediction unit.

Figure 3:
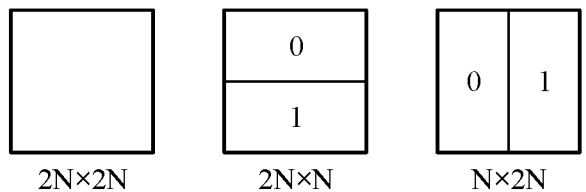
FIG. 3 is a schematic diagram of a prediction unit obtained by dividing an image frame according to an exemplary embodiment of the present disclosure.
Figure 3:
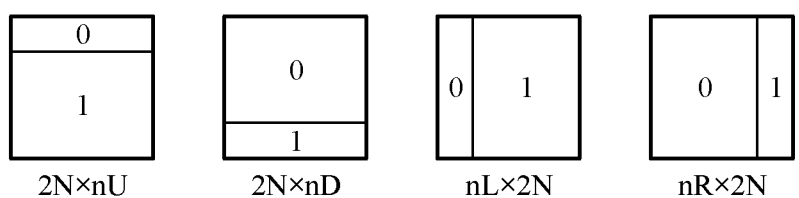

The video motion estimation apparatus may obtain a video from the local or the server. When the video needs to be edited, inter-frame prediction encoding needs to be performed on the video. In the process of inter-frame prediction encoding, motion estimation needs to be performed on each image frame in the video. During motion estimation on the image frame, the image frame in the video may be divided into a plurality of prediction units such as 2N×2N, 2N×N, N×2N, 2N×nU, 2N×nD, nL×2N, and nR×2N by using an inter-frame prediction unit PU. As shown in FIG. 3, 2N×2N, 2N×N, and N×2N are prediction units in a symmetric mode. For example, the 2N×N prediction unit includes a dividing block with an index of 0 and an index of 1 divided by a ratio of 1:1 up and down. 2N×nU, 2N×nD, nL×2N, and nR×2N are prediction units in an asymmetric mode. For example, the 2N×nD prediction unit includes a dividing block with an index of 0 and an index of 1 divided by a ratio of 3:1 up and down.

Since the prediction units of different modes are different, in order to prevent the prediction units of different modes all using the same processing method, for example, the prediction unit of the asymmetric mode adopts a search method with the same complexity as the prediction unit of the symmetric mode, therefore, in order to improve flexibility and efficiency of performing motion estimation on the video, after a plurality of prediction units are obtained, the plurality of prediction units may be divided into a first type of prediction unit and a second type of prediction unit. For example, the first type of prediction unit may include prediction units such as 2N×2N, 2N×N, N×2N, and the like in the symmetric mode, and the second type of prediction unit may include prediction units such as 2N×nU, 2N×nD, nL×2N, nR×2N, and the like in the asymmetric mode.

The method for dividing the prediction unit and the method for dividing the first type of prediction unit and the second type of prediction unit may be flexibly set according to actual needs, and specific content is not limited herein.

The terms "first" and "second" used in the exemplary embodiments of the present disclosure are merely for the purpose of description and are not to be construed as indicating or implying importance, or limiting the disclosure. For example, the first type of prediction unit and the second type of prediction unit both are prediction units. The first type of prediction unit corresponds to one type of prediction unit, and the second type of prediction unit corresponds to another type of prediction unit. However, there is no particular importance or significance of the first type of prediction unit relative to the second type of prediction unit, or vice versa.

In step S102, a motion vector of the first type of prediction unit is obtained according to a first search algorithm.

For the first type of prediction unit and the second type of prediction unit, the video motion estimation apparatus may respectively use different search algorithms to search the motion vector of the prediction unit. For example, for the first type of prediction unit, the motion vector of the first type of prediction unit may be obtained according to the first search algorithm. For the second type of prediction unit, a motion vector of the second type of prediction unit is obtained according to a second search algorithm. The first search algorithm is inconsistent with the second search algorithm, which are to be described in detail below.

In some exemplary embodiments, the operation of obtaining a motion vector of the first type of prediction unit according to a first search algorithm may include the following steps. In step (1), a second candidate starting search point corresponding to the first type of prediction unit is obtained, a rate-distortion cost of each second candidate starting search point is calculated, and a second candidate starting search point with the minimum rate-distortion cost is set as a second starting search point. In step (2), a plurality of second candidate points within the search window range centered on the second starting search point is obtained according to the second preset increasing step size, the rate-distortion cost of each second candidate point is calculated, and the point with the minimum rate-distortion cost from the plurality of second candidate points is selected to obtain a second undetermined point. In step (3), a second supplementary point not searched around each point corresponding to the second preset step size is obtained, and a rate-distortion cost of the second supplementary point is calculated in a case that the search step size corresponding to the second undetermined point is a second preset step size. In step (4), a location of the second undetermined point is set as the motion vector of the first type of prediction unit in a case that a point with minimum rate-distortion cost in the second undetermined point and the second supplementary point is the second undetermined point. In step (5), a location of the point with the minimum rate-distortion cost in the second undetermined point and the second supplementary point is set as the motion vector of the first type of prediction unit in a case that the point with the minimum rate-distortion cost in the second undetermined point and the second supplementary point is not the second undetermined point.

Specifically, the video motion estimation apparatus determines a starting search point (that is, the second starting search point) in the following manner.

The video motion estimation apparatus may obtain the second candidate starting search point corresponding to the first type of prediction unit through advanced motion vector prediction (AMVP). The AMVP technology is mainly to use the correlation between motion vectors in space domain and time domain to establish a list of candidate prediction MVs for the current prediction unit. There is a plurality of candidate prediction MVs in the list, and the video motion estimation apparatus may select the second candidate starting search point from the list of the plurality of candidate prediction MVs. Alternatively, the video motion estimation apparatus may also obtain a second candidate starting search point corresponding to the first type of prediction unit by using a Merge mode.

After the second candidate starting search point is obtained, the video motion estimation apparatus may calculate a rate-distortion cost of each second candidate starting search point, and set a second candidate starting search point with the minimum rate-distortion cost as the second starting search point. That is, the second starting search point is a finally determined starting search point corresponding to the first type of prediction unit. The formula for calculating the rate-distortion cost may be: rdcost=sad+lambda*bit, where rdcost represents the rate-distortion cost, sad represents a residual error, that is, a motion compensation prediction error, lambda represents a constant coefficient, which may be a Lagrangian factor, and bit represents a code rate, that is, a quantity of encoded bits of motion vector related information. Each rate-distortion cost below may be calculated by referring to the formula.

Then, the video motion estimation apparatus specifically searches an undetermined point (that is, a second undetermined point) within the search window range in the following manner.

Figure 4:
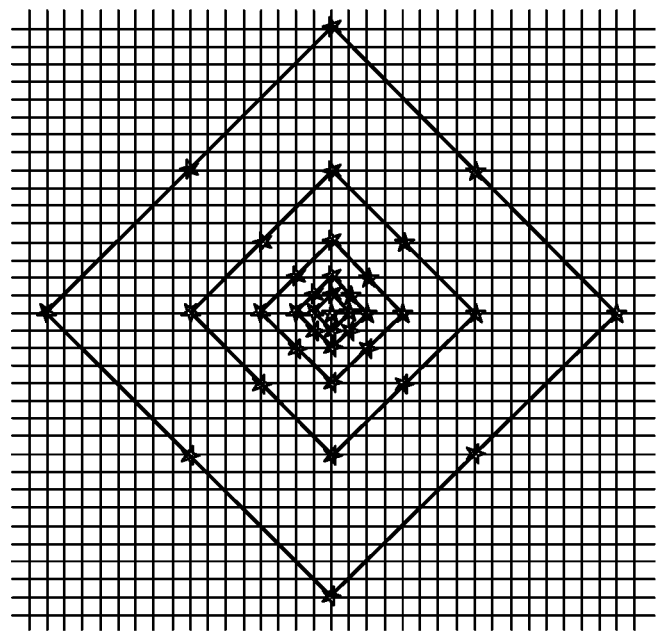
FIG. 4 is a schematic diagram of a diamond search template according to an exemplary embodiment of the present disclosure.

The video motion estimation apparatus may perform searching by using a diamond template, a square template, or the like. As shown in FIG. 4, the diamond template is used as an example, and the second starting search point is used as a center of the diamond template. From a search step size of 1, according to the diamond template shown in FIG. 4, a plurality of second candidate points are obtained, according to a second preset increasing step size, within a search window range centered on the second starting search point. The second preset increasing step size may be a step size increasing by an integer power of 2, that is, from the search step size of 1, and searching is performed with the search step sizes of 2, 4, and 8 in turn, to obtain a plurality of second candidate points. The second candidate points may be vertexes of the diamond template corresponding to each search step size, a midpoint between the two vertexes, and the like, for example, a location of a five-pointed star marked in FIG. 4. When a maximum search step size is set to 8, a corresponding search window range is an inner ring region of the diamond template corresponding to the search step size 8. When a maximum search step size is set to 16, a corresponding search window range is an inner ring region of the diamond template corresponding to the search step size 16, and so on. Then, the rate-distortion cost of each second candidate point is calculated, the point with the minimum rate-distortion cost is selected from the plurality of second candidate points, and the point with the minimum rate-distortion cost in the plurality of second candidate points is set as the second undetermined point.

Then, when the search step size corresponding to the second undetermined point is the second preset step size, two-point searching is performed around the undetermined point, which may be performed specifically as follows.

After the second undetermined point is obtained, the video motion estimation apparatus may determine whether the search step size corresponding to the second undetermined point is the second preset step size, and the second preset step size may be flexibly set according to actual needs. For example, the second preset step size may be set to 1, that is, when the search step size corresponding to the second undetermined point is 1, a second supplementary point not searched around each point corresponding to the second preset step size may be obtained, and the second supplementary point may include one or more points, as shown in FIG. 5.

Figure 5:
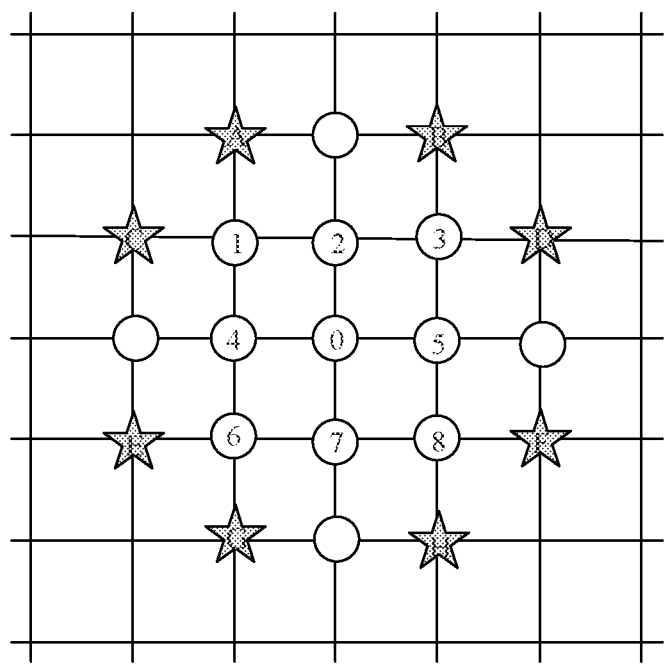
FIG. 5 is a schematic diagram of performing a two-point search around an undetermined point according to an exemplary embodiment of the present disclosure.

For example, in FIG. 5, when the search template for searching the second undetermined point is a diamond template, vertexes corresponding to the diamond with the search step size of 1 are four points of 2, 4, 5, and 7 if the search step size corresponding to the obtained second undetermined point is 1. In this case, if the obtained second undetermined point with the minimum rate-distortion cost is a location of 2, then two points of A and B are supplemented at the location of 2, and the two points of A and B may be set as second supplementary points. If the obtained second undetermined point with the minimum rate-distortion cost is a location of 4, then two points of C and E are supplemented at the location of 4, and the two points of C and E may be set as second supplementary points. If the obtained second undetermined point with the minimum rate-distortion cost is a location of 5, then two points of D and F are supplemented at the location of 5, and the two points of D and F may be set as second supplementary points. If the obtained second undetermined point with the minimum rate-distortion cost is a location of 7, then two points of G and H are supplemented at the location of 7, and the two points of G and H may be set as second supplementary points.

Finally, the point with the minimum rate-distortion cost may be selected from the second supplementary point and the second undetermined point in a specific manner as follows.

After the second supplementary point is obtained, the video motion estimation apparatus may calculate rate-distortion cost of each second supplementary point, compare the rate-distortion cost of the second supplementary point with the rate-distortion cost of the second undetermined point, and determine whether the point with the minimum rate-distortion cost in the second supplementary point and the second undetermined point is the second undetermined point. A location of the second undetermined point is set as the motion vector of the first type of prediction unit in a case that the point with the minimum rate-distortion cost in the second undetermined point and the second supplementary point is the second undetermined point.

The location of the point with the minimum rate-distortion cost in the second undetermined point and the second supplementary point is set as the motion vector of the first type of prediction unit in a case that the point with the minimum rate-distortion cost in the second undetermined point and the second supplementary point is not the second undetermined point.

Optionally, the operation of setting a location of the second undetermined point as the motion vector of the first type of prediction unit may include, in step (a), a motion vector of a searched prediction unit in the image frame is obtained, and a second target rate-distortion cost of a corresponding location of the first type of prediction unit is calculated according to the motion vector of the searched prediction unit. In step (b), a rate-distortion cost of the second undetermined point is compared to the target rate-distortion cost. In step (c), the motion vector of the searched prediction unit is set as the motion vector of the first type of prediction unit in a case that the rate-distortion cost of the second undetermined point is greater than the second target rate-distortion cost. In step (d), the location of the second undetermined point is set as the motion vector of the first type of prediction unit in a case that the rate-distortion cost of the second undetermined point is less than or equal to the second target rate-distortion cost.

When determining the motion vector of the first type of prediction unit, the video motion estimation apparatus may correct the motion vector of the currently searched first type of prediction unit according to the motion vector of the searched prediction unit in the image frame. Specifically, in the process of searching the motion vector of each prediction unit, the video motion estimation apparatus may store the motion vector of the searched prediction unit, and may generate a mapping relationship between a prediction unit identifier and the motion vector.

In the process of correcting the motion vector of the currently searched first type of prediction unit, the video motion estimation apparatus may obtain a mapping relationship corresponding to the searched prediction unit identifier, obtain the motion vector of the searched prediction unit in the image frame according to the mapping relationship, and calculate the second target rate-distortion cost of the corresponding location of the first type of prediction unit according to the motion vector of the searched prediction unit. For example, a corresponding location may be determined according to the motion vector of the searched prediction unit, the rate-distortion cost of the corresponding location is calculated, and the rate-distortion cost of the corresponding location obtained through calculation is set as the second target rate-distortion cost. Then, the rate-distortion cost of the second undetermined point may be compared with the second target rate-distortion cost.

In a case that the rate-distortion cost of the second undetermined point is greater than the second target rate-distortion cost, the motion vector of the searched prediction unit is set as the motion vector of the first type of prediction unit, that is, the motion vector of the first type of prediction unit is corrected to the motion vector of the searched prediction unit. The location of the second undetermined point is set as the motion vector of the first type of prediction unit in a case that the rate-distortion cost of the second undetermined point is less than or equal to the second target rate-distortion cost.

The searched prediction unit may include one or more prediction units, which may include one or more prediction units of the first type of prediction unit in the image frame, or may include one or more prediction units of the second type of prediction unit in the image frame, or may include both one or more prediction units of the first type of prediction unit in the image frame and one or more prediction units of the second type of prediction unit in the image frame, and so on. The searched prediction unit may also include one or more motion vectors.

For example, if the video motion estimation apparatus has searched for motion vectors of a 2N×2N prediction unit and a 2N×N prediction unit, then during current searching of a motion vector of an N×2N prediction unit, the motion vector of the N×2N prediction unit may be corrected by using the motion vectors of the 2N×2N prediction unit and the 2N×N prediction unit.

Optionally, the second type of prediction unit includes a third dividing block and a fourth dividing block, and the operation of obtaining a second candidate starting search point corresponding to the first type of prediction unit, calculating rate-distortion cost of each second candidate starting search point, and setting the second candidate starting search point with the minimum rate-distortion cost as a second starting search point may include, in a first step, obtaining at least one second candidate starting search point corresponding to the fourth dividing block in the first type of prediction unit through advanced motion vector prediction. In a second step, a prediction result of the third dividing block is obtained, and a rate-distortion cost of a location of the third dividing block is calculated according to the prediction result of the third dividing block in a case that the third dividing block in the first type of prediction unit is predicted. In a third step, the point with the minimum rate-distortion cost in the at least one second candidate starting search point and the third dividing block is set as the starting search point of the fourth dividing block in the first type of prediction unit, and the starting search point of the fourth dividing block is set as the second starting search point.

The first type of prediction unit may include a third dividing block with an index of 0 and a fourth dividing block with an index of 1. The video motion estimation apparatus may separately search for the motion vectors of the third dividing block and the fourth dividing block in the first type of prediction unit. When the starting search point of the fourth dividing block in the first type of prediction unit is determined, the motion vector of the searched third dividing block may be used for instructing the search process of the current fourth dividing block, that is, a location corresponding to the motion vector of the searched third dividing block may be used as one of the candidate starting search points of the current fourth dividing block. Alternatively, a location corresponding to the motion vector of the searched fourth dividing block is used as one of the candidate starting search points of the current third dividing block, and the location corresponding to the motion vector of the searched third dividing block is to be used as one of the starting search points of the current fourth dividing block, for example.

Specifically, in the process of searching for the fourth dividing block in the first type of prediction unit, the video motion estimation apparatus may obtain at least one second candidate starting search point corresponding to the fourth dividing block in the first type of prediction unit through the AMVP technology, and determine whether the third dividing block in the first type of prediction unit has been searched, that is, determine whether the third dividing block in the first type of prediction unit has been predicted. When the third dividing block in the first type of prediction unit is predicted, a prediction result of the third dividing block is obtained. The prediction result may be the motion vector of the third dividing block. In this case, rate-distortion cost of the location of the third dividing block may be calculated according to the prediction result of the third dividing block, that is, the rate-distortion cost of the location of the third dividing block may be calculated according to the motion vector of the third dividing block. For example, a corresponding location may be determined according to the motion vector of the third dividing block, the rate-distortion cost of the corresponding location is calculated, and the rate-distortion cost of the corresponding location obtained through calculation is set as the rate-distortion cost of the location of the third dividing block. In addition, the rate-distortion cost of each second candidate starting search point is calculated, the point with the minimum rate-distortion cost in at least one second candidate starting search point and the third dividing block is set as a starting search point of the fourth dividing block in the first type of prediction unit, and the starting search point of the fourth dividing block is set as the second starting search point, so as to perform the operation of obtaining, according to a second preset increasing step size, a plurality of second candidate points within the search window range centered on the second starting search point, calculating rate-distortion cost of each second candidate point, and selecting a point with the minimum rate-distortion cost from the plurality of second candidate points, to obtain a second undetermined point.

For example, the 2N×N prediction unit is used as an example. Assuming that a dividing block with the index of 0 in the 2N×N prediction unit has been predicted, in this case, when a dividing block with the index of 1 in the 2N×N prediction unit is predicted, a location of the motion vector in the prediction result corresponding to the dividing block with the index of 0 may be used as one of locations of the candidate starting search point of the dividing block with the index of 1, so that the point with the minimum rate-distortion cost may be selected as the starting search point from the candidate starting search points. In this way, the starting search point is closer to an optimal location for motion estimation, and may exit the search process faster.

Figure 6:
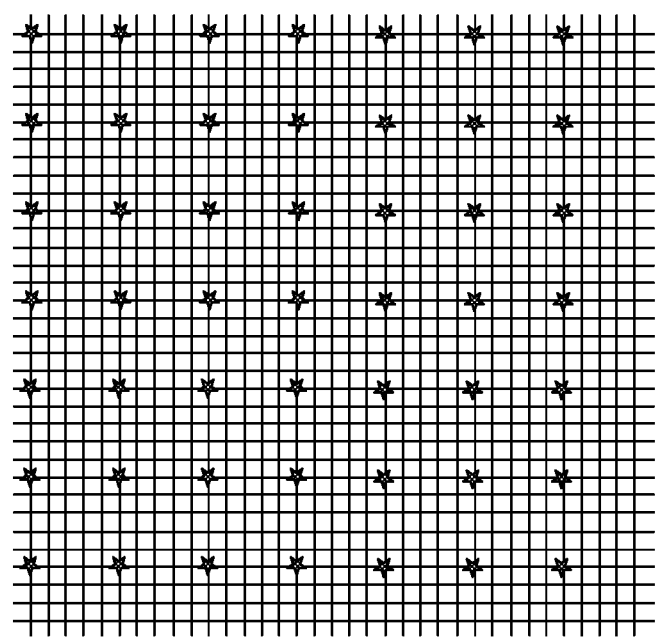
FIG. 6 is a schematic diagram of performing searching according to a preset interval step size according to an exemplary embodiment of the present disclosure.

In exemplary embodiments, after the operation of selecting a point with the minimum rate-distortion cost from the plurality of second candidate points, to obtain a second undetermined point, the video motion estimation method may further include, in a first step, searching, according to a preset interval step size, within a preset range centered on the second undetermined point in a case that the search step size corresponding to the second undetermined point is within a third preset step size threshold range, to obtain a plurality of search points, and calculating rate-distortion cost of each search point, In a second step, the point with the minimum rate-distortion cost in the second undetermined point and the plurality of search points is used as the second starting search point, and the operation of obtaining, according to the second preset increasing step size, a plurality of second candidate points within the search window range centered on the second starting search point is performed. In a third step, the rate-distortion cost of each second candidate point is calculated, and the point with the minimum rate-distortion cost from the plurality of second candidate points is selected to obtain a second undetermined point Specifically, after the second undetermined point is obtained, the video motion estimation apparatus may determine whether the search step size corresponding to the second undetermined point is within a third preset step size threshold range, where the third preset step size threshold range may be flexibly set according to actual needs. Alternatively, a distance from the point with the minimum rate-distortion cost to a center of the search window range may be obtained to determine whether the distance is within the first preset distance threshold range. The preset distance threshold range may be flexibly set according to actual needs. For example, the first preset distance threshold range may be greater than or equal to 5, and less than or equal to 8. Searching is performed according to a preset interval step size within a preset range centered on the second undetermined point in a case that the search step size corresponding to the second undetermined point is within a third preset step size threshold range (or the distance from the point with the minimum rate-distortion cost to the center of the search window range is within the first preset distance threshold range), to obtain a plurality of search points. The preset range and the preset interval step size may be flexibly set according to actual needs, and a specific value is not limited herein. For example, the preset interval step size may be set to 5 steps for each row and column. As shown in FIG. 6, within the search window range centered on the second undetermined point, all points are scanned every 5 rows and 5 columns by raster scanning, to obtain a plurality of search points. FIG. 6 is merely a partial schematic diagram of searching within the search window range according to the preset interval step size. The search window range may be flexibly set according to actual needs, for example, may be set to 128 rows 128 columns.

Then, rate-distortion cost of each search point is calculated, the point with the minimum rate-distortion cost in the second undetermined point and the plurality of search points is used as the second starting search point, and the operation of obtaining, according to the second preset increasing step size, a plurality of second candidate points within the search window range centered on the second starting search point, calculating the rate-distortion cost of each second candidate point, and selecting the point with the minimum rate-distortion cost from the plurality of second candidate points, to obtain a second undetermined point is performed.

In exemplary embodiments, after the operation of selecting a point with the minimum rate-distortion cost from the plurality of second candidate points, to obtain a second undetermined point, the video motion estimation method may further include, in a first step, the second undetermined point is used as the second starting search point, and performing the operation of obtaining, according to the second preset increasing step size, a plurality of second candidate points within the search window range centered on the second starting search point. In a second step, the rate-distortion cost of each second candidate point is calculated, and the point with the minimum rate-distortion cost from the plurality of second candidate points is selected to obtain a second undetermined point in a case that a search step size corresponding to the second undetermined point is within a fourth preset step size threshold range.

Specifically, after the second undetermined point is obtained, the video motion estimation apparatus may determine whether the search step size corresponding to the second undetermined point is within the fourth step size threshold range, where the fourth preset step size threshold range may be flexibly set according to actual needs. Alternatively, a distance from the point with the minimum rate-distortion cost to a center of the search window range may be obtained to determine whether the distance is within a second preset distance threshold range. The second preset distance threshold range may be flexibly set according to actual needs, for example, may be greater than 1 and less than 5. The second undetermined point is used as the second starting search point, and the operation of obtaining, according to the second preset increasing step size, a plurality of second candidate points within the search window range centered on the second starting search point, calculating the rate-distortion cost of each second candidate point, and selecting the point with the minimum rate-distortion cost from the plurality of second candidate points, to obtain a second undetermined point is performed in a case that a search step size corresponding to the second undetermined point is within the fourth preset step size threshold range (or a distance from the point with the minimum rate-distortion cost to the center of the search window range is within the first preset distance threshold range).

In step S103, a motion vector of the second type of prediction unit is obtained according to a second search algorithm.

For the second type of prediction unit, the video motion estimation apparatus may obtain the motion vector of the second type of prediction unit by using the second search algorithm.

In exemplary embodiments, the operation of obtaining a motion vector of the second type of prediction unit according to a second search algorithm may include obtaining a polygonal model according to the second search algorithm, and obtaining a current motion vector of the second type of prediction unit by moving the polygonal model; and obtaining a motion vector of a searched prediction unit in an image frame, and correcting the current motion vector according to the motion vector of the searched prediction unit, to obtain the motion vector of the second type of prediction unit.

In exemplary embodiments, the operation of obtaining a polygonal model according to the second search algorithm, and obtaining a current motion vector of the second type of prediction unit by moving the polygonal model may include, in step (1), obtaining a first undetermined point in the second type of prediction unit according to the second search algorithm. In step (2) a polygonal model centered on the first undetermined point is obtained, and a first target point according to the polygonal model is obtained in a case that a search step size of the first undetermined point is within a first preset step size threshold range. In step (3), the polygonal model is moved, and an optimal point is obtained according to the moved polygonal model in a case that the first target point is inconsistent with the first undetermined point. In step (4), a location of the optimal point is set as the current motion vector of the second type of prediction unit in a case that the optimal point is consistent with the first target point.

Specifically, the video motion estimation apparatus may obtain a first candidate starting search point corresponding to the second type of prediction unit through the AMP technology, select a first starting search point from the first candidate starting search point, then perform searching with the first starting search point as the center of a diamond template or a square template to obtain a plurality of first candidate points, and select a first undetermined point from the plurality of first candidate points.

After the first undetermined point is obtained, the video motion estimation apparatus may determine whether the search step size corresponding to the first undetermined point is within the first preset step size threshold range, where the first preset step size threshold range may be flexibly set according to actual needs. When a search step size of the first undetermined point is within the first preset step size threshold range, a polygonal model is obtained, where the polygonal model may be quadrilateral, hexagonal, or the like.

After the polygonal model is obtained, the video motion estimation apparatus may obtain the first target point according to the polygonal model. For example, the video motion estimation apparatus may calculate rate-distortion cost of locations of the center of the polygonal model and each vertex, and set the point with the minimum rate-distortion cost in the center of the polygonal model and each vertex as the first target point.

After the first target point is obtained, the video motion estimation apparatus may determine whether the first target point is consistent with the first undetermined point. When the first target point is inconsistent with the first undetermined point, it indicates that the obtained first target point may not be the optimal point, and there may be an optimal point with the rate-distortion cost less than that of the first target point around the first target point. In this case, the polygonal model is moved, and the optimal point is obtained according to the moved polygonal model. The optimal point may be the point with the minimum rate-distortion cost in the moved polygonal model.

Alternatively, or in addition, the operation of moving the polygonal model, and obtaining an optimal point according to the moved polygonal model in a case that the first target point is inconsistent with the first undetermined point may include: moving a center of the polygonal model to a location of the first target point in a case that the first target point is inconsistent with the first undetermined point; and selecting a point with the minimum rate-distortion cost from the center of the moved polygonal model and each vertex, to obtain the optimal point.

An original shape of the moved polygonal model remains unchanged. For example, the center of the polygonal model may be moved to the location of the first target point. Then the rate-distortion cost of locations of the center of the moved polygonal model and each vertex is calculated, and the point with the minimum rate-distortion cost in the center of the moved polygonal model and each vertex is set as the optimal point.

After the optimal point is obtained, the video motion estimation apparatus may determine whether the optimal point is consistent with the first target point. A location of the optimal point is set as the current motion vector of the second type of prediction unit in a case that the optimal point is consistent with the first target point.

Optionally, after the operation of obtaining the first target point according to the polygonal model, the video motion estimation method may further include: setting a location of the first target point as the current motion vector of the second type of prediction unit in a case that the first target point is consistent with the first undetermined point.

Figure 7:
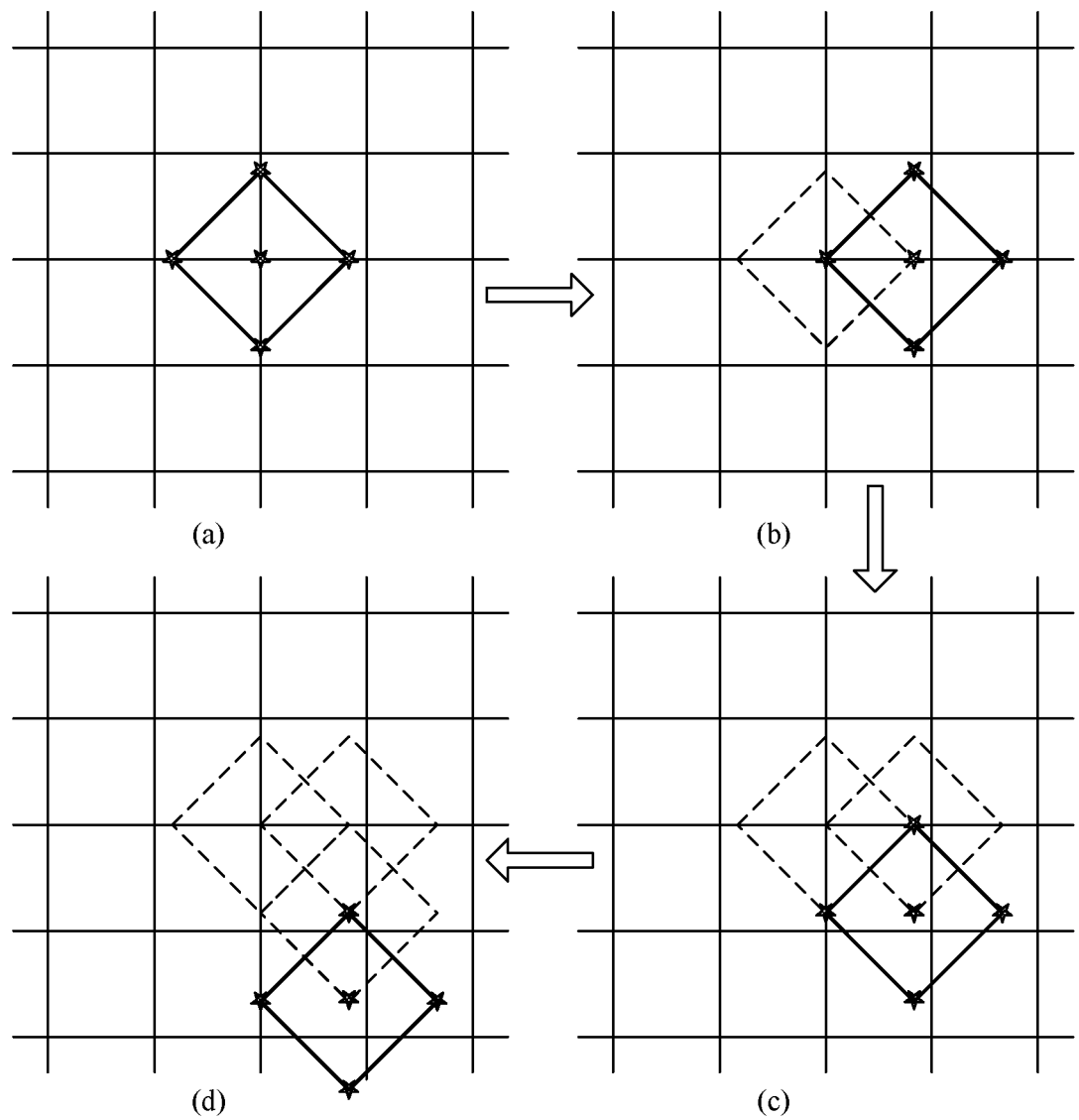
FIG. 7 is a schematic diagram of moving a quadrilateral model according to an exemplary embodiment of the present disclosure.

For example, as shown in FIG. 7, when the polygonal model is a diamond model, the center of the diamond model is moved to the location of the right vertex if the point (that is, the optimal point) with the minimum rate-distortion cost obtained through calculation of rate distortion cost of the center of the diamond model and upper, lower, left, and right vertexes in FIG. 7 (a) is a location of the right vertex of the diamond model, as shown in FIG. 7 (b). In this case, the rate-distortion cost of the center of the moved diamond model and the upper, lower, left, and right vertexes is calculated. If the obtained point with the minimum rate-distortion cost is a location of the lower vertex of the diamond model, then the center of the diamond model is moved to the location of the lower vertex, as shown in FIG. 7 (c). In this case, the rate-distortion cost of the center of the moved diamond model and the upper, lower, left, and right vertexes is calculated. If the obtained point with the minimum rate-distortion cost is a location of the lower vertex of the diamond model, then the center of the diamond model is moved to the location of the lower vertex, as shown in FIG. 7 (d). In this case, the rate-distortion cost of the center of the moved diamond model and the upper, lower, left, and right vertexes is calculated. If the obtained point with the minimum rate-distortion cost is a location of the center of the diamond model, that is, the optimal point is the location of the center of the diamond model, then the diamond model is no longer moved, and the location (that is, the location of the optimal point) of the center of the diamond model is set as a current motion vector of the second type of prediction unit.

In exemplary embodiments, the operation of obtaining a first undetermined point in the second type of prediction unit according to the second search algorithm, obtaining a polygonal model centered on the first undetermined point, and obtaining a first target point according to the polygonal model in a case that a search step size of the first undetermined point is within a first preset step size threshold range may include, in step (a), obtaining a point with the minimum rate-distortion cost in the second type of prediction unit according to the second search algorithm, to obtain the first undetermined point. In step (b), a polygonal model centered on the first undetermined point is obtained in a case that a search step size corresponding to the first undetermined point is within a first preset step size threshold range. In step (c), a point with the minimum rate-distortion cost from a midpoint of the polygonal model and each vertex is selected to obtain the first target point.

Specifically, the video motion estimation apparatus may obtain a first candidate starting search point corresponding to the second type of prediction unit through the AMP technology, calculate rate-distortion cost of the first candidate starting search point, set the point with the minimum rate-distortion cost as a first starting search point, and then perform searching with the first starting search point as the center of a diamond template or a square template, to obtain a plurality of first candidate points. Rate-distortion cost of each first candidate point is calculated, and the point with the minimum rate-distortion cost is selected from the plurality of first candidate points and set as a first undetermined point.

After the first undetermined point is obtained, the video motion estimation apparatus may determine whether the search step size corresponding to the first undetermined point is within the first preset step size threshold range, where the first preset step size threshold range may be flexibly set according to actual needs. A polygonal model such as a quadrilateral model or a hexagonal model centered on the first undetermined point is obtained in a case that a search step size of the first undetermined point is within a first preset step size threshold range.

After the polygonal model is obtained, the video motion estimation apparatus may calculate rate-distortion cost of locations of the center of the polygonal model and each vertex, and set the point with the minimum rate-distortion cost in the center of the polygonal model and each vertex as the first target point. The video motion estimation apparatus may further calculate rate-distortion cost of the center of the polygonal model, each vertex, and a location (or a location of a trisection point of each side) of a midpoint of each side, and set the point with the minimum rate-distortion cost as the first target point.

Optionally, the operation of obtaining a point with the minimum rate-distortion cost in the second type of prediction unit according to the second search algorithm, to obtain the first undetermined point may include, in a first step, obtaining a first candidate starting search point corresponding to the second type of prediction unit according to the second search algorithm. In a second step, a rate-distortion cost of each first candidate starting search point is calculated, and the first candidate starting search point with the minimum rate-distortion cost is set as a first starting search point. In a third step, a plurality of first candidate points within a search window range centered on the first starting search point are obtained according to a first preset increasing step size. In a fourth step, a point with minimum rate-distortion cost from the plurality of first candidate points is selected to obtain the first undetermined point.

Specifically, the video motion estimation apparatus may obtain the first candidate starting search point corresponding to the second type of prediction unit through the AMVP technology or the Merge mode, then calculate rate distortion cost of each first candidate starting search point, and set the first candidate starting search point with the minimum rate-distortion cost as a first starting search point, that is, the first starting search point is a finally determined starting search point corresponding to the second type of prediction unit.

After the first starting search point is obtained, the video motion estimation apparatus may search for, according to the first preset increasing step size, a plurality of first candidate points within the search window range centered on the first starting search point. The search window range may be a search range of the diamond template or the square template. For example, the search window range may be an inner ring region corresponding to a maximum search step size of the diamond template or the square template. For example, when the maximum search step size of the diamond template is set to 8, the corresponding search window range is the inner ring region of the diamond template corresponding to a search step size of 8. The first preset increasing step size may be a step size that increases by an integer power of 2, or may be flexibly set according to actual needs.

The diamond template is used as an example. As shown in FIG. 4, the first starting search point is used as the center of the diamond template. From a search step size of 1, searching is performed according to the step size increasing by an integer power of 2, to obtain a plurality of first candidate points. The first candidate point may be a vertex of the diamond template corresponding to each search step size, a midpoint between the two vertexes, and the like, for example, a location of a five-pointed star as marked in FIG. 4. Then, the rate-distortion cost of each first candidate point is calculated, the point with the minimum rate-distortion cost is selected from the plurality of first candidate points, and the point with the minimum rate-distortion cost in the plurality of first candidate points is set as the first undetermined point.

In exemplary embodiments, the second type of prediction unit includes a first dividing block and a second dividing block, and the operation of obtaining a first candidate starting search point corresponding to the second type of prediction unit according to the second search algorithm, calculating rate-distortion cost of each first candidate starting search point, and setting the first candidate starting search point with the minimum rate-distortion cost as a first starting search point may include, in a first step, obtaining at least one first candidate starting search point corresponding to the second dividing block in the second type of prediction unit through advanced motion vector prediction according to the second search algorithm. In a second step, a prediction result of the first dividing block is obtained, a rate-distortion cost of each first candidate starting search point is calculated, and a rate-distortion cost of a location of the first dividing block according to the prediction result of the first dividing block is calculated in a case that the first dividing block in the second type of prediction unit is predicted. In a third step, the point with the minimum rate-distortion cost from the least one first candidate starting search point and the first dividing block is obtained. In a fourth step, the obtained point with the minimum rate-distortion cost is set as the starting search point of the second dividing block in the second type of prediction unit, and the starting search point of the second dividing block is set as the first starting search point.

The second type of prediction unit may include a first dividing block with an index of 0 and a second dividing block with an index of 1. The video motion estimation apparatus may separately search for the motion vectors of the first dividing block and the second dividing block in the second type of prediction unit. When the starting search point of the second dividing block in the second type of prediction unit is determined, the motion vector of the searched first dividing block may be used for instructing the search process of the current second dividing block, that is, a location corresponding to the motion vector of the searched first dividing block may be used as one of starting search points of the current second dividing block. Alternatively, a location corresponding to the motion vector of the searched second dividing block is used as one of candidate starting search points of the current first dividing block, and a location corresponding to the motion vector of the searched first dividing block is to be used as one of the starting search points of the current second dividing block, for example.

Specifically, in the process of searching for the second dividing block in the second type of prediction unit, the video motion estimation apparatus may obtain at least one first candidate starting search point corresponding to the second dividing block in the second type of prediction unit through the AMVP technology, and determine whether the first dividing block in the second type of prediction unit has been searched, that is, determine whether the first dividing block in the second type of prediction unit has been predicted. When the first dividing block in the second type of prediction unit is predicted, a prediction result of the first dividing block is obtained. The prediction result may be the motion vector of the first dividing block obtained through prediction. Rate-distortion cost of the location of the first dividing block may be calculated according to the prediction result of the first dividing block, that is, the rate-distortion cost of the location of the first dividing block may be calculated according to the motion vector of the first dividing block. For example, a corresponding location may be determined according to the motion vector of the first dividing block, the rate-distortion cost of the corresponding location is calculated, and the rate-distortion cost of the corresponding location obtained through calculation is set as the rate-distortion cost of the location of the first dividing block. In addition, the rate-distortion cost of each first candidate starting search point is calculated, the point with the minimum rate-distortion cost in at least one first candidate starting search point and the first dividing block is set as a starting search point of the second dividing block in the second type of prediction unit, and the starting search point of the second dividing block is set as the second starting search point, so as to perform the operation of searching for, according to a first preset increasing step size, a plurality of first candidate points within the search window range centered on the first starting search point, and calculating rate-distortion cost of each first candidate point.

For example, the nR×2N prediction unit is used as an example. Assuming that a dividing block with the index of 0 in the nR×2N prediction unit has been predicted, in this case, when a dividing block with the index of 1 in the nR×2N prediction unit is predicted, a location of the motion vector in the prediction result corresponding to the dividing block with the index of 0 may be used as one of locations of the candidate starting search point of the dividing block with the index of 1, so that the point with the minimum rate-distortion cost may be selected as the starting search point from the candidate starting search points. In this way, the starting search point is closer to an optimal location for motion estimation, and may exit the search process faster.

In exemplary embodiments, after the operation of obtaining a point with the minimum rate-distortion cost in the second type of prediction unit according to the second search algorithm, to obtain the first undetermined point, the video motion estimation method may further include, in a first step, obtaining a first supplementary point not searched around each point corresponding to the first preset step size, and calculating rate-distortion cost of the first supplementary point in a case that the search step size corresponding to the first undetermined point is a first preset step size. In a second step, a location of the first undetermined point is set as a current motion vector of the second type of prediction unit in a case that the point with the minimum rate-distortion cost in the first undetermined point and the first supplementary point is the first undetermined point. In a third step, a location of the point with the minimum rate-distortion cost in the first undetermined point and the first supplementary point is set as a current motion vector of the second type of prediction unit in a case that the point with the minimum rate-distortion cost in the first undetermined point and the first supplementary point is not the first undetermined point.

Specifically, after the first undetermined point is obtained, the video motion estimation apparatus may determine whether the search step size corresponding to the first undetermined point is the first preset step size. The first preset step size may be flexibly set according to actual needs. For example, the first preset step size may be set to 1, that is, when the search step size corresponding to the first undetermined point is 1, a second supplementary point not searched around each point corresponding to the first preset step size may be obtained, and the second supplementary point may include one or more points, as shown in FIG. 5.

For example, in FIG. 5, when the search template for searching the second undetermined point is a diamond template, vertexes corresponding to the diamond with the search step size of 1 are four points of 2, 4, 5, and 7 if the search step size corresponding to the obtained second undetermined point is 1. In this case, if the obtained second undetermined point with the minimum rate-distortion cost is a location of 2, then two points of A and B are supplemented at the location of 2, and the two points of A and B may be set as second supplementary points. If the obtained second undetermined point with the minimum rate-distortion cost is a location of 5, then two points of D and F are supplemented at the location of 5, and the two points of D and F may be set as second supplementary points.

After the first supplementary point is obtained, the video motion estimation apparatus may calculate rate-distortion cost of the first supplementary point, compare the rate-distortion cost of the first supplementary point with the rate-distortion cost of the first undetermined point, and determine whether the point with the minimum rate-distortion cost in the first supplementary point and the first undetermined point is the first undetermined point. A location of the first undetermined point is set as a current motion vector of the second type of prediction unit in a case that the point with the minimum rate-distortion cost in the first undetermined point and the first supplementary point is the first undetermined point. A location of the point with the minimum rate-distortion cost in the first undetermined point and the first supplementary point is set as a current motion vector of the second type of prediction unit in a case that the point with the minimum rate-distortion cost in the first undetermined point and the first supplementary point is not the first undetermined point.

In exemplary embodiments, after the operation of obtaining a point with the minimum rate-distortion cost in the second type of prediction unit according to the second search algorithm, to obtain the first undetermined point, the video motion estimation method may further include setting the first undetermined point as a first starting search point, and performing the operation of searching for, according to a first preset increasing step size, a plurality of first candidate points within a search window range centered on the first starting search point in a case that the search step size corresponding to the first undetermined point is within a second preset step size threshold range.

Specifically, after the first undetermined point is obtained, the video motion estimation apparatus may determine whether the search step size corresponding to the first undetermined point is within the second preset step size threshold range, where the second preset step size threshold range may be flexibly set according to actual needs. When the search step size corresponding to the first undetermined point is within the second preset step size threshold range, the first undetermined point is set as a first starting search point, and the operation of searching for, according to the first preset increasing step size, a plurality of first candidate points within a search window range centered on the first starting search point, and calculating rate-distortion cost of each first candidate point is performed.

After the current motion vector of the second type of prediction unit is obtained, the video motion estimation apparatus may obtain a motion vector of a searched prediction unit in an image frame, and correct the current motion vector according to the motion vector of the searched prediction unit, to obtain the motion vector of the second type of prediction unit. Details may be described as follows.

After the current motion vector of the second type of prediction unit is obtained, the video motion estimation apparatus may obtain a motion vector of a searched prediction unit in an image frame. The searched prediction unit may include one or more prediction units, may include one or more prediction units of the first type of prediction unit in the image frame, or may include one or more prediction units of the second type of prediction unit in the image frame, or may include both one or more prediction units of the first type of prediction unit in the image frame and one or more prediction units of the second type of prediction unit in the image frame. Then the current motion vector is corrected according to the motion vector of the searched prediction unit, to obtain the motion vector of the second type of prediction unit.

In exemplary embodiments, the operation of obtaining a motion vector of a searched prediction unit in an image frame, and correcting the current motion vector according to the motion vector of the searched prediction unit, to obtain the motion vector of the second type of prediction unit may include, in a first step, obtaining a motion vector of a searched prediction unit in the image frame, and calculating first target rate-distortion cost of a corresponding location of the second type of prediction unit according to the motion vector of the searched prediction unit. In a second step, a current rate-distortion cost of the second type of prediction unit is determined according to the current motion vector of the second type of prediction unit. In a third step, the current rate-distortion cost of the second type of prediction unit is compared to the first target rate-distortion cost. In a fourth step, the motion vector of the searched prediction unit is set as the motion vector of the second type of prediction unit in a case that the current rate-distortion cost of the second type of prediction unit is greater than the first target rate-distortion cost. In a fifth step, a location of a point corresponding to the current rate-distortion cost is set as the motion vector of the second type of prediction unit in a case that the current rate-distortion cost of the second type of prediction unit is less than or equal to the first target rate-distortion cost.

Specifically, when determining the motion vector of the second type of prediction unit, the video motion estimation apparatus may correct the current motion vector of the currently searched second type of prediction unit according to the motion vector of the searched prediction unit in the image frame. Specifically, in the process of searching the motion vector of each prediction unit, the video motion estimation apparatus may store the motion vector of the searched prediction unit, and may generate a mapping relationship between a prediction unit identifier and the motion vector.

In the process of correcting the motion vector of the currently searched second type of prediction unit, the video motion estimation apparatus may obtain a mapping relationship corresponding to the searched prediction unit identifier, obtain the motion vector of the searched prediction unit in the image frame according to the mapping relationship, and calculate the first target rate-distortion cost of the corresponding location of the second type of prediction unit according to the motion vector of the searched prediction unit. For example, a corresponding location may be determined according to the motion vector of the searched prediction unit, the rate-distortion cost of the corresponding location is calculated, and the rate-distortion cost of the corresponding location obtained through calculation is set as the first target rate-distortion cost.

Then, the video motion estimation apparatus may compare the current rate-distortion cost of the second type of prediction unit with the first target rate-distortion cost. If the current rate-distortion cost of the second type of prediction unit is greater than the first target rate-distortion cost, the motion vector of the searched prediction unit is set as the motion vector of the second type of prediction unit. If the current rate-distortion cost of the second type of prediction unit is less than or equal to the first target rate-distortion cost, a location of a point corresponding to the current rate-distortion cost is set as the motion vector of the second type of prediction unit.

Figure 9:
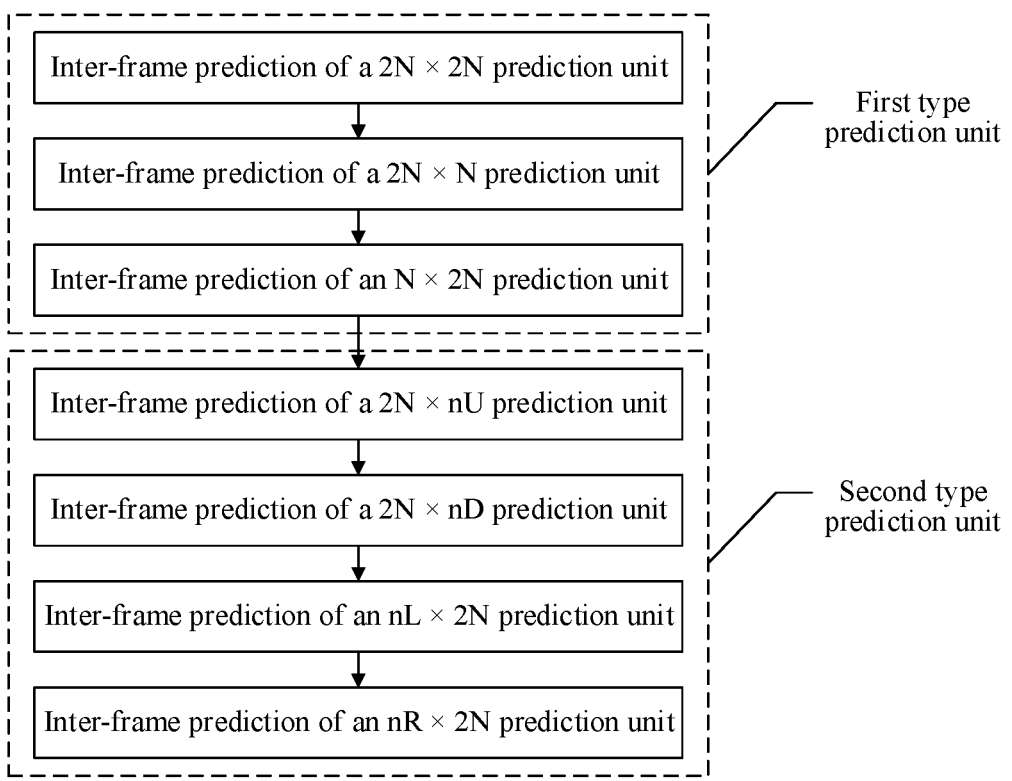
FIG. 9 is a schematic diagram of a motion vector search sequence of different prediction units according to an exemplary embodiment of the present disclosure.

For example, as shown in FIG. 9, if the video motion estimation apparatus searches for a motion vector corresponding to each prediction unit in the order of a 2N×2N prediction unit, a 2N×N prediction unit, an N×2N prediction unit, a 2N×nU prediction unit, a 2N×nD prediction unit, an nL×2N prediction unit, and an nR×2N prediction unit, motion vectors of the previously searched 2N×2N prediction unit, 2N×N prediction unit, N×2N prediction unit, 2N×nU prediction unit, and the like may be used for correcting the motion vector of the currently searched 2N×nD prediction unit when the 2N×nD prediction unit is currently searched.

In step S104, sub-pixel motion estimation is performed on the image frame according to the motion vector of the first type of prediction unit and the motion vector of the second type of prediction unit.

After the motion vector of the first type of prediction unit and the motion vector of the second type of prediction unit are obtained, the video motion estimation apparatus may perform sub-pixel motion estimation on the image frame according to the motion vector of the first type of prediction unit and the motion vector of the second type of prediction unit. The process of obtaining the motion vector of the first type of prediction unit and the motion vector of the second type of prediction unit is obtaining an integer-pixel motion vector by performing integer-pixel motion prediction (that is, integer-pixel search) on the image frame. For example, when performing sub-pixel motion estimation on the image frame, the video motion estimation apparatus may perform a half-pixel search and a quarter-pixel precision search according to the motion vector obtained through integer-pixel motion prediction, to obtain a precision motion vector. Motion compensation processing is performed on the precision motion vector, for example, processing such as discrete cosine transform (DCT) quantization, and the like is performed on the obtained precision motion vector to obtain a residual coefficient. Then, the obtained residual coefficient is sent to an entropy encoding module to output a code stream. In addition, after the residual coefficient is inversely quantized and inversely transformed, a residual value of a reconstructed image is obtained, and the reconstructed image is obtained according to the residual value. The reconstructed image enters a reference frame queue after in-loop filtering, and is used as the reference image of the next frame, so that encoding is performed backward frame by frame.

Accordingly, image frames in a video may be divided into a plurality of prediction units, and the plurality of prediction units is classified. For example, the plurality of prediction units is divided into a first type of prediction unit and a second type of prediction unit. For different types of prediction units, motion vectors of different types of prediction units are obtained by using different search algorithms. For example, a motion vector of the first type of prediction unit is obtained according to a first search algorithm, and a motion vector of the second type of prediction unit is obtained according to a second search algorithm. Subsequently, sub-pixel motion estimation may be performed on the image frame according to the motion vector of the first type of prediction unit and the motion vector of the second type of prediction unit. According to this solution, a plurality of prediction units may be classified, and the motion vectors of different types of prediction units are obtained by using different search algorithms, which leads to relatively high search efficiency. Therefore, in comparison to the same processing method used for different prediction units in the related art, efficiency and flexibility of performing motion estimation on the video are improved.

According to the method described in the foregoing exemplary embodiment, detailed description is to be given through examples.

The foregoing video motion estimation apparatus is to be described. The video motion estimation apparatus may be integrated in a terminal such as a computer, a mobile phone, a television, or the like that has a storage unit, is equipped with circuitry such as a microprocessor, and has computing capability as a computer. Description is to be given from the perspective of the terminal.

The terminal may obtain the video from the local or a server, and divide the image frame in the video into a plurality of prediction units such as a 2N×2N prediction unit, a 2N×N prediction unit, an N×2N prediction unit, a 2N×nU prediction unit, a 2N×nD prediction unit, an nL×2N prediction unit, an nR×2N prediction unit, and the like by using an inter-frame prediction unit PU.

As shown in FIG. 3, the 2N×N prediction unit includes a dividing block with an index of 0 and a dividing block with an index of 1 divided at a ratio of 1:1 up and down, and the N×2N prediction unit includes a dividing block with an index of 0 and a dividing block with an index of 1 divided at a ratio of 1:1 left and right, the 2N×nU prediction unit includes a dividing block with an index of 0 and a dividing block with an index of 1 divided at a ratio of 1:3 up and down, the 2N×nD prediction unit includes a dividing block with an index of 0 and a dividing block with an index of 1 divided at a ratio of 3:1 up and down, the nL×2N prediction unit includes a dividing block with an index of 0 and a dividing block with an index of 1 divided at a ratio of 1:3 left and right, and the nR×2N prediction unit includes a dividing block with an index of 0 and a dividing block with an index of 1 divided at a ratio of 3:1 left and right.

Then, the terminal may divide the obtained plurality of prediction units into a first type of prediction unit and a second type of prediction unit symmetrically. The first type of prediction unit may include prediction units such as 2N×2N, 2N×N, N×2N, and the like in the symmetric mode, and the second type of prediction unit may include prediction units such as 2N×nU, 2N×nD, nL×2N, nR×2N, and the like in the asymmetric mode.

For the first type of prediction unit and the second type of prediction unit, the terminal may respectively use different search algorithms to search for the motion vector of the prediction unit. Details are to be described below.

Figure 10:
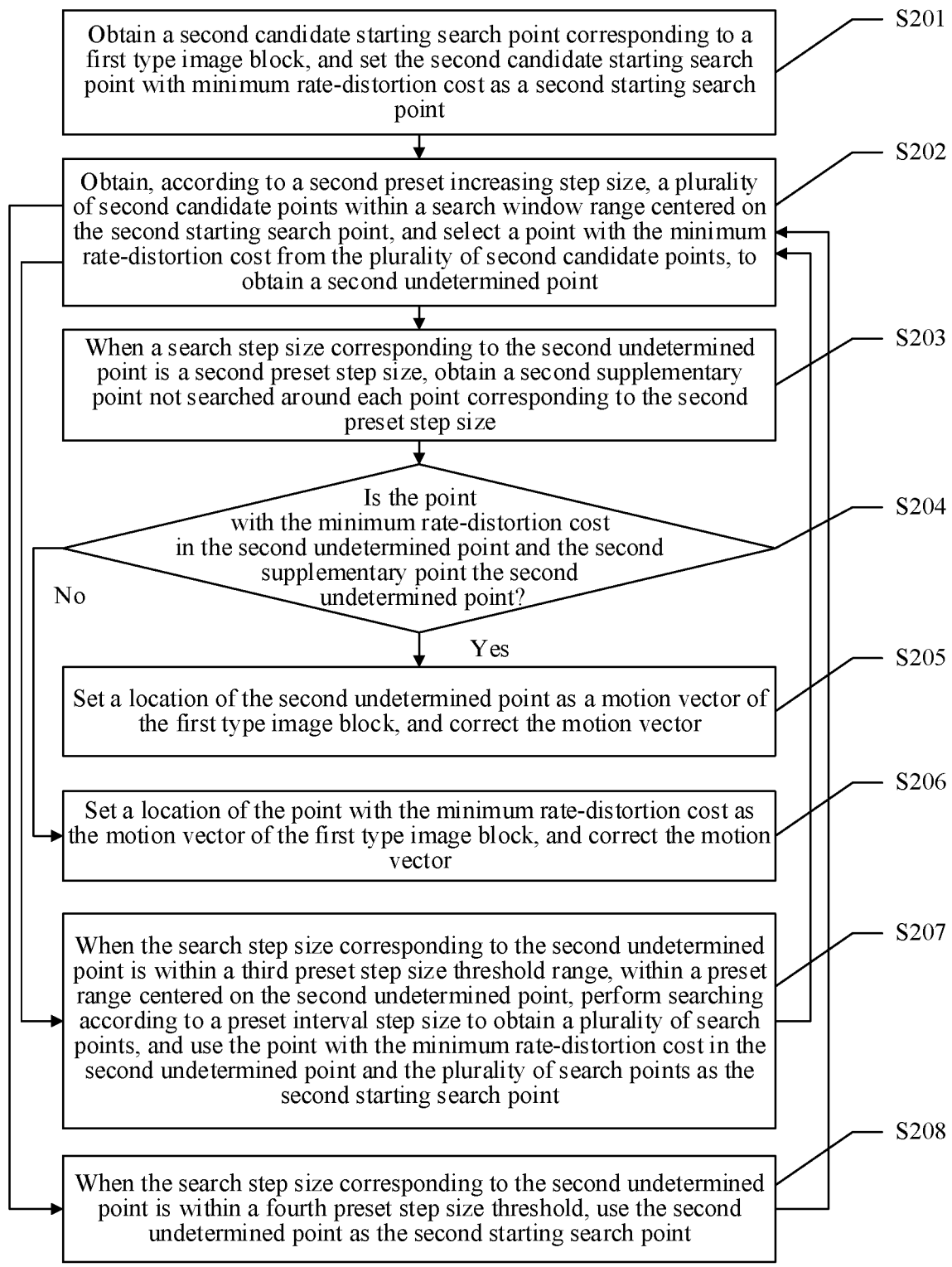
FIG. 10 is a schematic flowchart of searching for a motion vector of a first type of prediction unit according to an exemplary embodiment of the present disclosure.

For the first type of prediction unit, FIG. 10 is a schematic flowchart of searching for a motion vector of a first type of prediction unit according to an embodiment of this application. The method process may include the following steps.

In a step S201, a terminal obtains a second candidate starting search point corresponding to a first type of prediction unit, and sets a second candidate starting search point with the minimum rate-distortion cost as a second starting search point.

The terminal may obtain one or more second candidate starting search points through the AMVP technology or the Merge mode, calculate rate distortion cost of each second candidate starting search point, and set the second candidate starting search point with the minimum rate-distortion cost as a second starting search point, that is, the second starting search point is a finally determined starting search point corresponding to the first type of prediction unit.

The formula for calculating the rate-distortion cost may be: rdcost=sad+lambda*bit, where rdcost represents the rate-distortion cost, sad represents a residual error, that is, a motion compensation prediction error, lambda represents a constant coefficient, which may be a Lagrangian factor, and bit represents a code rate, that is, a quantity of encoded bits of motion vector related information.

The first type of prediction unit may include a third dividing block with an index of 0 and a fourth dividing block with an index of 1. The terminal may separately search for motion vectors of the third dividing block and the fourth dividing block in the first type of prediction unit. When the starting search point of the fourth dividing block in the first type of prediction unit is determined, a location corresponding to the motion vector of the searched third dividing block may be used as one of candidate starting search points of the current fourth dividing block. Specifically, in the process of searching for the fourth dividing block in the first type of prediction unit, the terminal may obtain at least one second candidate starting search point corresponding to the fourth dividing block in the first type of prediction unit through the AMVP technology, and determine whether the third dividing block in the first type of prediction unit has been predicted. When the third dividing block in the first type of prediction unit has been predicted, a motion vector of the third dividing block obtained through prediction is obtained, a prediction point corresponding to the motion vector of the third dividing block obtained through prediction is determined, and rate-distortion cost of each second candidate starting search point and the third dividing block is calculated. The point with the minimum rate-distortion cost in the at least one second candidate starting search point and the third dividing block is set as the starting search point of the fourth dividing block in the first type of prediction unit, and the starting search point of the fourth dividing block is set as the second starting search point, to perform step S202.

For example, a 2N×N prediction unit is used as an example. Assuming that a dividing block with the index of 0 in the 2N×N prediction unit has been predicted, in this case, when a dividing block with the index of 1 in the 2N×N prediction unit is predicted, a location corresponding to the motion vector in the prediction result corresponding to the dividing block with the index of 0 may be used as one of locations of the candidate starting search point of the dividing block with the index of 1, so that the point with the minimum rate-distortion cost may be selected as the starting search point from the candidate starting search points. In this way, the starting search point is closer to an optimal location for motion estimation, and may exit the search process faster.

In step S202, the terminal obtains, according to a second preset increasing step size, a plurality of second candidate points within a search window range centered on the second starting search point, and selects a point with the minimum rate-distortion cost from the plurality of second candidate points, to obtain a second undetermined point.

After the second undetermined point is obtained, the terminal may perform searching, according to the second preset increasing step size by using a diamond template, a square template, or the like, within the search window range centered on the second starting search point, to obtain the plurality of second candidate points.

For example, the square template is used as an example, and the second starting search point is used as a center of the square template. From a search step size of 1, a plurality of second candidate points are obtained, according to the second preset increasing step size, within the search window range centered on the second starting search point. The second preset increasing step size may increase by an integer power of 2, that is, from the search step size of 1, searching is performed with the search step sizes of 2, 4, and 8 in turn, to obtain a plurality of second candidate points. The second candidate points may be vertexes of the square template corresponding to each search step size, a point corresponding to a quarter between two vertexes, and the like. When a maximum search step size is set to 8, a corresponding search window range is an inner ring region of the square template corresponding to the search step size 8. When a maximum search step size is set to 16, a corresponding search window range is an inner ring region of the square template corresponding to the search step size 16, and so on.

Then, the rate-distortion cost of each second candidate point is calculated, the point with the minimum rate-distortion cost is selected from the plurality of second candidate points, and the point with the minimum rate-distortion cost in the plurality of second candidate points is set as the second undetermined point.

In step S203, the terminal obtains a second supplementary point not searched around each point corresponding to the second preset step size in a case that the search step size corresponding to the second undetermined point is a second preset step size.

After the second undetermined point is obtained, the terminal may determine whether the search step size corresponding to the second undetermined point is a second preset step size. The second preset step size may be flexibly set according to actual needs, for example, the second preset step size may be set to 1, 2, or the like.

The terminal obtains a second supplementary point not searched around each point corresponding to the second preset step size in a case that the search step size corresponding to the second undetermined point is a second preset step size.

For example, in a case that the search template for searching for the second undetermined point is a square template and the search step size corresponding to the obtained second undetermined point is 1, vertexes corresponding to the square with the search step size of 1 are four points of 1, 3, 6, and 8, and 2, 4, 5, and 7 are midpoints of each side of the square. In this case, if the obtained second undetermined point with the minimum rate-distortion cost is a location of 1, then two points of A and C are supplemented at the location of 1, and the two points of A and C may be set as second supplementary points. If the obtained second undetermined point with the minimum rate-distortion cost is a location of 2, then two points of A and B are supplemented at the location of 2, and the two points of A and B may be set as second supplementary points. If the obtained second undetermined point with the minimum rate-distortion cost is a location of 3, then two points of B and D are supplemented at the location of 3, and the two points of B and D may be set as second supplementary points. If the obtained second undetermined point with the minimum rate-distortion cost is a location of 4, then two points of C and E are supplemented at the location of 4, and the two points of C and E may be set as second supplementary points. If the obtained second undetermined point with the minimum rate-distortion cost is a location of 5, then two points of D and F are supplemented at the location of 5, and the two points of D and F may be set as second supplementary points. If the obtained second undetermined point with the minimum rate-distortion cost is a location of 6, then two points of E and G are supplemented at the location of 6, and the two points of E and G may be set as second supplementary points. If the obtained second undetermined point with the minimum rate-distortion cost is a location of 7, then two points of G and H are supplemented at the location of 7, and the two points of G and H may be set as second supplementary points. If the obtained second undetermined point with the minimum rate-distortion cost is a location of 8, then two points of F and H are supplemented at the location of 8, and the two points of F and H may be set as second supplementary points.

In step S204, the terminal determines whether a point with minimum rate-distortion cost in the second undetermined point and the second supplementary point is the second undetermined point. If the point with the minimum rate-distortion cost is the second undetermined point, the terminal performs step S205, and if not, the terminal performs step S206.

After the second supplementary point is obtained, the terminal may calculate rate-distortion cost of each second supplementary point, compare the rate-distortion cost of the second supplementary point with the rate-distortion cost of the second undetermined point, and determine whether the point with the minimum rate-distortion cost in the second supplementary point and the second undetermined point is the second undetermined point.

In step S205, the terminal sets a location of the second undetermined point as a motion vector of the first type of prediction unit, and corrects the motion vector.

In step S206, a location of the point with the minimum rate-distortion cost in the second undetermined point and the second supplementary point is set as a motion vector of a first type image block, and the motion vector is corrected.

The terminal sets the location of the second undetermined point as a motion vector of the first type of prediction unit in a case that the point with the minimum rate-distortion cost in the second undetermined point and the second supplementary point is the second undetermined point. The terminal sets the location of a point with the minimum rate-distortion cost in the second undetermined point and the second supplementary point as the motion vector of the first type image block in a case that the point with the minimum rate-distortion cost in the second undetermined point and the second supplementary point is not the second undetermined point.

In this case, the terminal may correct the motion vector of the first type of prediction unit. Specifically, in the process of searching for the motion vector of each prediction unit, the terminal may store the motion vector of the searched prediction unit, and may generate a mapping relationship between a prediction unit identifier and the motion vector.

In the process of correcting the motion vector of the currently searched first type of prediction unit, the terminal may obtain a mapping relationship corresponding to the searched prediction unit identifier, obtain the motion vector of the searched prediction unit in the image frame according to the mapping relationship, and calculate second target rate-distortion cost of the first type of prediction unit according to the motion vector of the searched prediction unit. Then, the rate-distortion cost of the second undetermined point may be compared with the second target rate-distortion cost.

In a case that rate-distortion cost cost_best of the second undetermined point is greater than second target rate-distortion cost cost_ref, a motion vector mv_ref of the searched prediction unit is set as a motion vector mv_best of the first type of prediction unit, that is, the motion vector mv_best of the first type of prediction unit is corrected to the motion vector mv_ref of the searched prediction unit: mv_best=mv_ref. The location of the second undetermined point is set as the motion vector of the first type of prediction unit in a case that the rate-distortion cost of the second undetermined point is less than or equal to the second target rate-distortion cost.

For example, the motion vector of each prediction unit may be named in advance, and a naming algorithm may be: mv_best_prediction unit type_prediction unit index, for example, mv_best_2N×N_PU1 indicates a motion vector of a dividing block with an index of 1 in the 2N×N prediction unit. Assuming that the terminal has searched for motion vectors of a 2N×2N prediction unit and the 2N×N prediction unit, then during current searching of a motion vector of an N×2N prediction unit, the motion vector of the N×2N prediction unit may be corrected by using the motion vectors of the 2N×2N prediction unit and the 2N×N prediction unit. For example, for motion vectors of a dividing block PU0 with an index of 0 and a dividing block PUT with an index of 1 in the N×2N prediction unit, reference may be made to the motion vectors of the 2N×2N prediction unit and the 2N×N prediction unit={mv_best_2N×2N_PU0, mv_best_2N×2N_PU1, mv_best_2N×N_PU0, mv_best_2N×N_PU1}.

In step S207, the terminal performs searching, according to a preset interval step size, within a preset range centered on the second undetermined point in a case that the search step size corresponding to the second undetermined point is within a third preset step size threshold range, to obtain a plurality of search points, uses the point with the minimum rate-distortion cost in the second undetermined point and the plurality of search points as a second starting search point, and performs step S202.

After the second undetermined point is obtained, the terminal may determine whether the search step size corresponding to the second undetermined point is within a third preset step size threshold range, where the third preset step size threshold range may be flexibly set according to actual needs, and a specific value is not limited herein.

Searching is performed according to a preset interval step size within a preset range centered on the second undetermined point in a case that the search step size corresponding to the second undetermined point is within a third preset step size threshold range, to obtain a plurality of search points. The preset range and the preset interval step size may be flexibly set according to actual needs, and a specific value is not limited herein. For example, as shown in FIG. 6, within the search window range centered on the second undetermined point, all points are scanned every 5 rows and 5 columns by raster scanning, to obtain a plurality of search points.

Then, rate-distortion cost of each search point is calculated, the point with the minimum rate-distortion cost in the second undetermined point and the plurality of search points is used as the second starting search point, and the operation of obtaining, according to the second preset increasing step size, a plurality of second candidate points within the search window range centered on the second starting search point, and selecting the point with the minimum rate-distortion cost from the plurality of second candidate points, to obtain a second undetermined point is performed.

In step S208, when the search step size corresponding to the second undetermined point is within a fourth preset step size threshold range, the terminal uses the second undetermined point as a second starting search point, and performs step S202.

After the second undetermined point is obtained, the terminal may determine whether the search step size corresponding to the second undetermined point is within the fourth step size threshold range, where the fourth preset step size threshold range may be flexibly set according to actual needs, and the specific content is not limited herein. When a search step size corresponding to the second undetermined point is within a fourth preset step size threshold range, the second undetermined point is used as the second starting search point, and the operation of obtaining, according to the second preset increasing step size, a plurality of second candidate points within the search window range centered on the second starting search point, and selecting the point with the minimum rate-distortion cost from the plurality of second candidate points, to obtain a second undetermined point is performed.

Figure 11:
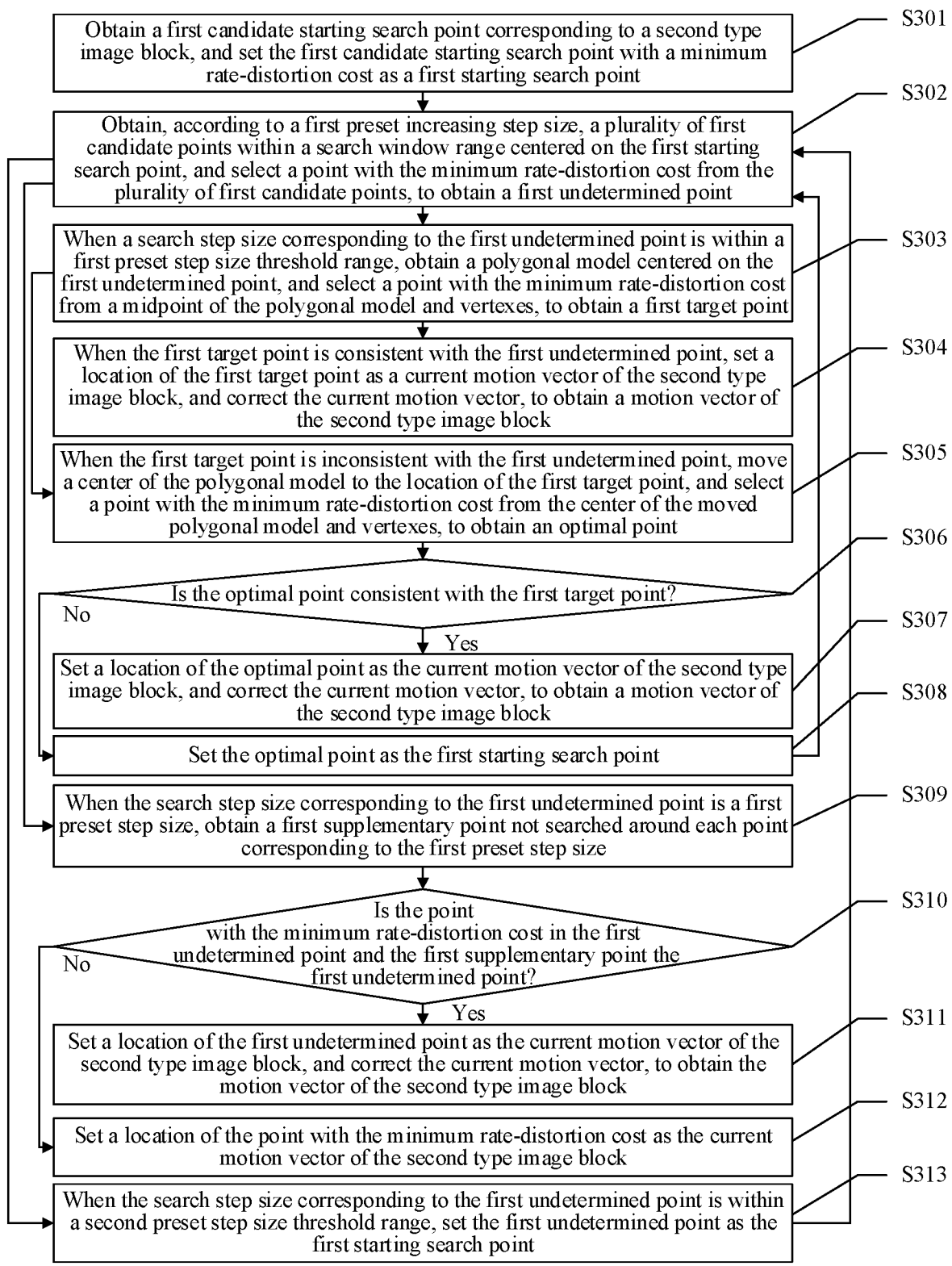
FIG. 11 is a schematic flowchart of searching for a motion vector of a second type of prediction unit according to an exemplary embodiment of the present disclosure.

For a second type of prediction unit, FIG. 11 is a schematic flowchart of searching for a motion vector of a second type of prediction unit according to an embodiment of this application. The method process may include the following steps.

In step, S301, a terminal obtains a first candidate starting search point corresponding to a second type of prediction unit, and sets a first candidate starting search point with the minimum rate-distortion cost as a first starting search point. The terminal may obtain the first candidate starting search point corresponding to the second type of prediction unit through the AMVP technology or the Merge mode, then calculate rate distortion cost of each first candidate starting search point, and set the first candidate starting search point with the minimum rate-distortion cost as a first starting search point, that is, the first starting search point is a finally determined starting search point corresponding to the second type of prediction unit.

The second type of prediction unit may include a first dividing block with an index of 0 and a second dividing block with an index of 1. The terminal may separately search for motion vectors of the first dividing block and the second dividing block in the second type of prediction unit. When the starting search point of the second dividing block in the second type of prediction unit is determined, a location corresponding to the motion vector of the searched first dividing block may be used as one of starting search points of the current second dividing block. Specifically, in the process of searching for the second dividing block in the second type of prediction unit, the terminal may obtain at least one first candidate starting search point corresponding to the second dividing block in the second type of prediction unit through the AMVP technology, and determine whether the first dividing block in the second type of prediction unit has been searched, that is, determine whether the first dividing block in the second type of prediction unit has been predicted. When the first dividing block in the second type of prediction unit has been predicted, a motion vector of the first dividing block obtained through prediction is obtained, a prediction point corresponding to the motion vector of the first dividing block obtained through prediction is determined, and rate-distortion cost of each first candidate starting search point and the first dividing block is calculated. The point with the minimum rate-distortion cost in the at least one first candidate starting search point and the first dividing block is set as the starting search point of the second dividing block in the second type of prediction unit, and the starting search point of the second dividing block is set as the second starting search point, to perform step S302.

For example, a 2N×nD prediction unit is used as an example. If a dividing block with the index of 0 in the 2N×nD prediction unit has been predicted, in this case, when a dividing block with the index of 1 in the 2N×nD prediction unit is predicted, a location of the motion vector corresponding to the dividing block with the index of 0 may be used as one of locations of the candidate starting search point of the dividing block with the index of 1, so that the point with the minimum rate-distortion cost may be selected as the starting search point from the candidate starting search points. In this way, the starting search point is closer to an optimal location for motion estimation, and may exit the search process faster.

In step S302, the terminal obtains, according to a first preset increasing step size, a plurality of first candidate points within a search window range centered on the first starting search point, and selects a point with the minimum rate-distortion cost from the plurality of first candidate points, to obtain a first undetermined point.

After the first starting search point is obtained, the terminal may search for, according to the first preset increasing step size, a plurality of first candidate points within the search window range centered on the first starting search point. The search window range may be a search range of a diamond template or a square template. For example, the search window range may be an inner ring region corresponding to a maximum search step size of the diamond template or the square template. For example, when the maximum search step size of the diamond template is set to 8, the corresponding search window range is the inner ring region of the diamond template corresponding to a search step size of 8. The first preset increasing step size may be a step size that increases by an integer power of 2, or may be flexibly set according to actual needs.

For example, the square template is used as an example, and the first starting search point is used as a center of the square template. From a search step size of 1, a plurality of first candidate points are searched, according to a search step size increasing by an integer power of 2, within the search window range centered on the first starting search point, to obtain a plurality of first candidate points. The first candidate points may be vertexes of the square template corresponding to each search step size, a point corresponding to a quarter between two vertexes, and the like.

Then, the rate-distortion cost of each first candidate point is calculated, the point with the minimum rate-distortion cost is selected from the plurality of first candidate points, and the point with the minimum rate-distortion cost in the plurality of first candidate points is set as the first undetermined point.

In step S303, when a search step size of the first undetermined point is within a first preset step size threshold range, the terminal obtains a polygonal model centered on the first undetermined point, and selects a point with the minimum rate-distortion cost from a midpoint of the polygonal model and each vertex, to obtain a first target point.

After the first undetermined point is obtained, the terminal may determine whether the search step size corresponding to the first undetermined point is within a first preset step size threshold range, where the first preset step size threshold range may be flexibly set according to actual needs, and a specific value is not limited herein.

When a search step size of the first undetermined point is within the first preset step size threshold range, the terminal obtains a polygonal model centered on the first undetermined point, and the polygonal model may be quadrilateral, hexagonal, or the like.

After the polygonal model is obtained, the terminal may calculate rate-distortion cost of locations of the center of the polygonal model and each vertex, and set a point with the minimum rate-distortion cost in the center of the polygonal model and each vertex as the first target point.

In step S304, when the first target point is consistent with the first undetermined point, the terminal sets a location of the first target point as a current motion vector of the second type of prediction unit, and corrects the current motion vector, to obtain a motion vector of the second type of prediction unit.

After the first target point is obtained, the terminal may determine whether the first target point is consistent with the first undetermined point. When the first target point is consistent with the first undetermined point, the terminal may set the location of the first target point as the current motion vector of the second type of prediction unit.

After the current motion vector of the second type of prediction unit is obtained, the terminal may obtain a motion vector of a searched prediction unit in an image frame. The searched prediction unit may include one or more prediction units, and correct the current motion vector of the second prediction unit according to the motion vector of the searched prediction unit, to obtain the motion vector of the second type of prediction unit.

Specifically, in the process of searching the motion vector of each prediction unit, the terminal may store the motion vector of the searched prediction unit, and may generate a mapping relationship between a prediction unit identifier and the motion vector. In the process of correcting the motion vector of the currently searched second type of prediction unit, the terminal may obtain a mapping relationship corresponding to the searched prediction unit identifier, obtain the motion vector of the searched prediction unit in the image frame according to the mapping relationship, and calculate first target rate-distortion cost of the second type of prediction unit according to the motion vector of the searched prediction unit.

Then, the terminal may compare the current rate-distortion cost of the second type of prediction unit with the first target rate-distortion cost. If the current rate-distortion cost of the second type of prediction unit is greater than the first target rate-distortion cost, the motion vector of the searched prediction unit is set as the motion vector of the second type of prediction unit. If the current rate-distortion cost of the second type of prediction unit is less than or equal to the first target rate-distortion cost, a location of a point corresponding to the current rate-distortion cost is set as the motion vector of the second type of prediction unit.

For example, the motion vector of each prediction unit may be named in advance, and a naming algorithm may be: mv_best_prediction unit type_prediction unit index, for example, mv_best_2N×N_PU1 indicates a motion vector of a dividing block with an index of 1 in a 2N×N prediction unit. For the 2N×N prediction unit, the motion vector of the searched prediction unit in the image frame may include: {mv_best_2N×2N_PU0, mv_best_2N×2N_PU1}.

For an N×2N prediction unit, the motion vector of the searched prediction unit in the image frame may include:

{mv_best_2N×2N_PU0, mv_best_2N×2N_PU1, mv_best_2N×N_PU0, mv_best_2N×N_PU1}.

For a 2N×nU prediction unit, the motion vector of the searched prediction unit in the image frame may include: {mv_best_2N×2N_PU0, mv_best_2N×2N_PU1, mv_best_2N×N_PU0, mv_best_2N×N_PU1, mv_best_N×2N_PU0, mv_best_N×2N_PU1}.

For a 2N×nD prediction unit, the motion vector of the searched prediction unit in the image frame may include: {mv_best_2N×2N_PU0, mv_best_2N×2N_PU1, mv_best_2N×N_PU0, mv_best_2N×N_PU1, mv_best_N×2N_PU0, mv_best_N×2N_PU1, mv_best_2N×nU_PU0, mv_best_2N×nU_PU1}.

For an nL×2N prediction unit, the motion vector of the searched prediction unit in the image frame may include: {mv_best_2N×2N_PU0, mv_best_2N×2N_PU1, mv_best_2N×N_PU0, mv_best_2N×N_PU1, mv_best_N×2N_PU0, mv_best_N×2N_PU1, mv_best_2N×nU_PU0, mv_best_2N×nU_PU1, mv_best_2N×nD_PU0, mv_best_2N×nD_PU1}.

For an nR×2N prediction unit, the motion vector of the searched prediction unit in the image frame may include: {mv_best_2N×2N_PU0, mv_best_2N×2N_PU1, mv_best_2N×N_PU0, mv_best_2N×N_PU1, mv_best_N×2N_PU0, mv_best_N×2N_PU1, mv_best_2N×nU_PU0, mv_best_2N×nU_PU1, mv_best_2N×nD_PU0, mv_best_2N×nD_PU1, mv_best_nL×2N_PU0, mv_best_nL×2N_PU1}.

In step S305, when the first target point is inconsistent with the first undetermined point, the terminal moves a center of the polygonal model to a location of the first target point, and selects a point with the minimum rate-distortion cost from the center of the moved polygonal model and each vertex, to obtain an optimal point.

When the first target point is inconsistent with the first undetermined point, the terminal may move a center of the polygonal model to a location of the first target point, and an original shape remains unchanged after the polygonal model is moved. Then the rate-distortion cost of locations of the center of the moved polygonal model and each vertex is calculated, and the point with the minimum rate-distortion cost in the center of the moved polygonal model and each vertex is set as the optimal point.

Figure 8:
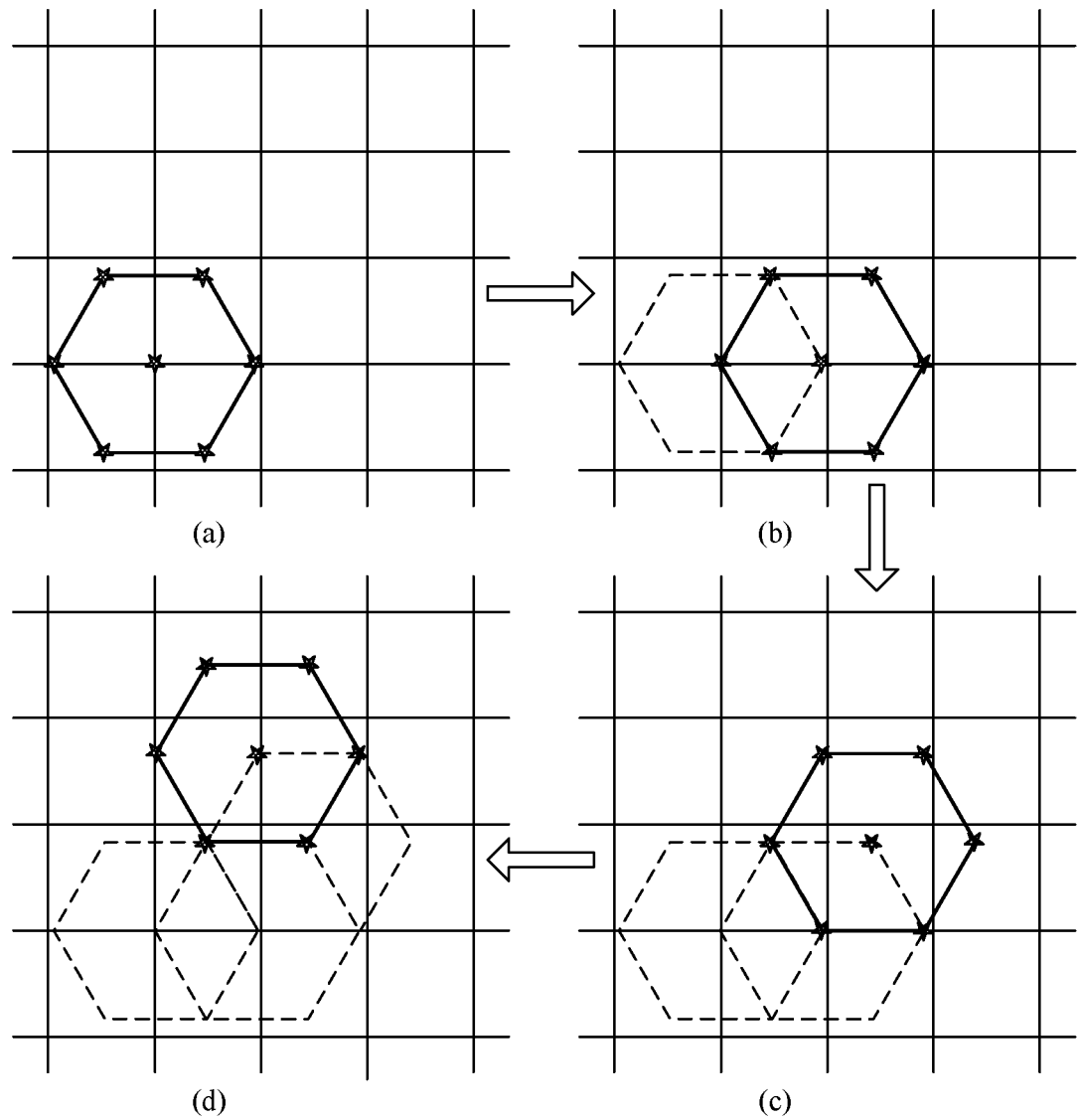
FIG. 8 is a schematic diagram of moving a hexagonal model according to an exemplary embodiment of the present disclosure.

For example, as shown in FIG. 8, in a case that the polygonal model is a hexagonal model and the point (that is, the optimal point) with the minimum rate-distortion cost obtained by calculating rate-distortion cost of a center of the hexagonal model and each vertex in FIG. 8 (a) is a location of a right vertex of the hexagonal model, the center of the hexagonal model is moved to the location of the right vertex, as shown in FIG. 8 (b). In this case, the rate-distortion cost of a center of the moved hexagonal model and each vertex is calculated. If the obtained point with the minimum rate-distortion cost is a location of a top right vertex of the hexagonal model, the center of the hexagonal model is moved to the location of the top right vertex, as shown in FIG. 8(c). In this case, the rate-distortion cost of the center and each vertex of the moved hexagonal model is calculated. If the obtained point with the minimum rate-distortion cost is a location of a top left vertex of the hexagonal model, the center of the hexagonal model is moved to the location of the top left vertex, as shown in FIG. 8(d). In this case, the rate-distortion cost of the center and each vertex of the moved hexagonal model is calculated. If the obtained point with the minimum rate-distortion cost is a location of the center of the hexagonal model, that is, the optimal point is the location of the center of the hexagonal model, then the hexagonal model is no longer moved, and the location (that is, the location of the optimal point) of the center of the hexagonal model is set as the current motion vector of the second type of prediction unit.

In step S306, the terminal determines whether the optimal point is consistent with the first target point. If the optimal point is consistent with the first target point, the terminal performs step S307, and if not, the terminal performs step S308.

After the optimal point is obtained, the terminal may determine whether the optimal point is consistent with the first target point.

In step S307, the terminal sets a location of the optimal point as a current motion vector of the second type of prediction unit, and corrects the current motion vector, to obtain a motion vector of the second type of prediction unit.

If the optimal point is consistent with the first target point, the terminal may set a location of the optimal point as the current motion vector of the second type of prediction unit. In addition, the terminal may correct the obtained current motion vector of the second type of prediction unit according to the method of correcting the current motion vector of the second type of prediction unit.

In step S308, the terminal sets the optimal point as the first starting search point, and performs step S302.

If the optimal point is inconsistent with the first target point, the terminal sets the optimal point as the first starting search point, and performs the operation of searching, according to a first preset increasing step size, a plurality of first candidate points within a search window range centered on the first starting search point, and selecting the point with the minimum rate-distortion cost from the plurality of first candidate points, to obtain the first undetermined point.

In step S309, the terminal obtains a first supplementary point not searched around each point corresponding to the first preset step size in a case that the search step size corresponding to the first undetermined point is a first preset step size.

After the first undetermined point is obtained, the terminal may determine whether the search step size corresponding to the first undetermined point is the first preset step size, where the first preset step size threshold range may be flexibly set according to actual needs, and a specific value is not limited herein. The terminal may obtain a first supplementary point not searched around each point corresponding to the first preset step size in a case that the search step size corresponding to the first undetermined point is the first preset step size.

For example, in a case that the search template for searching for the first undetermined point is a square template and the search step size corresponding to the obtained first undetermined point is 1, vertexes corresponding to the square with the search step size of 1 are four points of 1, 3, 6, and 8, and 2, 4, 5, and 7 are midpoints of each side of the square. In this case, if the obtained first undetermined point with the minimum rate-distortion cost is a location of 1, then two points of A and C are supplemented at the location of 1, and the two points of A and C may be set as first supplementary points. If the obtained first undetermined point with the minimum rate-distortion cost is a location of 3, then two points of B and D are supplemented at the location of 3, and the two points of B and D may be set as first supplementary points. If the obtained first undetermined point with the minimum rate-distortion cost is a location of 6, then two points of E and G are supplemented at the location of 6, and the two points of E and G may be set as first supplementary points. If the obtained first undetermined point with the minimum rate-distortion cost is a location of 8, then two points of F and H are supplemented at the location of 8, and the two points of F and H may be set as first supplementary points.

In step S310, the terminal determines whether the point with the minimum rate-distortion cost in the first undetermined point and the first supplementary point is the first undetermined point. If the point with minimum rate-distortion cost is the first underdetermined point, the terminal performs step S311, and if not, the terminal performs step S312.

After the first supplementary point is obtained, the terminal may calculate rate-distortion cost of the first supplementary point, compare the rate-distortion cost of the first supplementary point with the rate-distortion cost of the first undetermined point, and determine whether the point with the minimum rate-distortion cost in the first supplementary point and the first undetermined point is the first undetermined point.

In step S311, the terminal sets a location of the first undetermined point as a current motion vector of the second type of prediction unit, and corrects the current motion vector, to obtain a motion vector of the second type of prediction unit.

A location of the first undetermined point is set as a current motion vector of the second type of prediction unit in a case that the point with the minimum rate-distortion cost in the first undetermined point and the first supplementary point is the first undetermined point. In addition, the terminal may correct the obtained current motion vector of the second type of prediction unit according to the method of correcting the current motion vector of the second type of prediction unit, to obtain a motion vector of a second type image block.

In step S312, the terminal sets a location of a point with the minimum rate-distortion cost in the first undetermined point and the first supplementary point as a current motion vector of the second type image block, and corrects the current motion vector, to obtain the motion vector of the second type image block.

The terminal may set the location of a point with the minimum rate-distortion cost in the first undetermined point and the first supplementary point as the current motion vector of the second type image block in a case that the point with the minimum rate-distortion cost in the first undetermined point and the first supplementary point is not the first undetermined point. In addition, the terminal may correct the obtained current motion vector of the second type of prediction unit according to the method of correcting the current motion vector of the second type of prediction unit, to obtain the motion vector of the second type image block.

In step S313, when the search step size corresponding to the first undetermined point is within a second preset step size threshold range, the terminal sets the first undetermined point as the first starting search point, and performs step S302.

After the first undetermined point is obtained, the terminal may determine whether the search step size corresponding to the first undetermined point is within a second preset step size threshold range, where the second preset step size threshold range may be flexibly set according to actual needs, and a specific value is not limited herein.

When the search step size corresponding to the first undetermined point is within the second preset step size threshold range, the first undetermined point is set as the first starting search point, and the operation of searching for, according to the first preset increasing step size, a plurality of first candidate points within a search window range centered on the first starting search point, and selecting a point with the minimum rate-distortion cost from the plurality of first candidate points, to obtain the first undetermined point is performed.

After the motion vector of the first type of prediction unit and the motion vector of the second type of prediction unit are obtained, the terminal may perform sub-pixel motion estimation on the image frame according to the motion vector of the first type of prediction unit and the motion vector of the second type of prediction unit. For example, the terminal may perform processing such as discrete cosine transform and quantization according to the obtained motion vector, to obtain a residual coefficient. Then, the obtained residual coefficient is sent to an entropy encoding module to output a code stream. In addition, after the residual coefficient is inversely quantized and inversely transformed, a residual value of a reconstructed image is obtained, and the reconstructed image is obtained according to the residual value. The reconstructed image enters a reference frame queue after in-loop filtering, and is used as the reference image of the next frame, so that encoding is performed backward frame by frame.

In the embodiments of this application, the image frame in a video may be divided into a plurality of prediction units, and the plurality of prediction units are divided into a first type of prediction unit and a second type of prediction unit. For the first type of prediction unit, a more complex search algorithm may be used for searching, and for the second type of prediction unit, a fast search algorithm may be used for searching, thereby accelerating the process of motion estimation. In addition, when there are two dividing blocks in one prediction unit, for the dividing block searched later, reference may be made to the final search result of the searched dividing block, thereby accelerating the process of motion estimation. Moreover, some results that a partial optimal location may be searched are corrected by using a correction strategy to avoid a search error, so that an encoding speed is greatly increased, and a compression ratio loss is less.

To facilitate better implementation of the video motion estimation method provided in the embodiments of this application, an exemplary embodiment of the present disclosure further provides an apparatus based on the foregoing video motion estimation method. For specific implementation details of the functions carried out by the apparatus, refer to the description in the exemplary method embodiment above.

Figure 12:
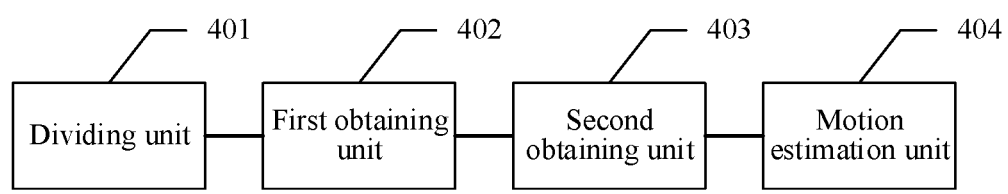
FIG. 12 is a schematic structural diagram of a video motion estimation apparatus according to an exemplary embodiment of the present disclosure.

FIG. 12 is a schematic structural diagram of a video motion estimation apparatus according to an exemplary embodiment of the present disclosure. The video motion estimation apparatus may include a dividing unit 401, a first obtaining unit 402, a second obtaining unit 403, and a motion estimation unit 404. For example, one or more of the units included in the video motion estimation apparatus can be implemented by circuitry.

The dividing unit 401 includes circuitry configured to divide image frames in a video into a plurality of prediction units, and divide the plurality of prediction units into a first type of prediction unit and a second type of prediction unit.

For specific descriptions of the functions performed by dividing unit 401, reference may be made to the exemplary embodiment described in step S101 above.

The first obtaining unit 402 includes circuitry configured to obtain a motion vector of the first type of prediction unit according to a first search algorithm.

For specific descriptions of the functions performed by first obtaining unit 402, reference may be made to the exemplary embodiment described in step S102 above.

Figure 14:
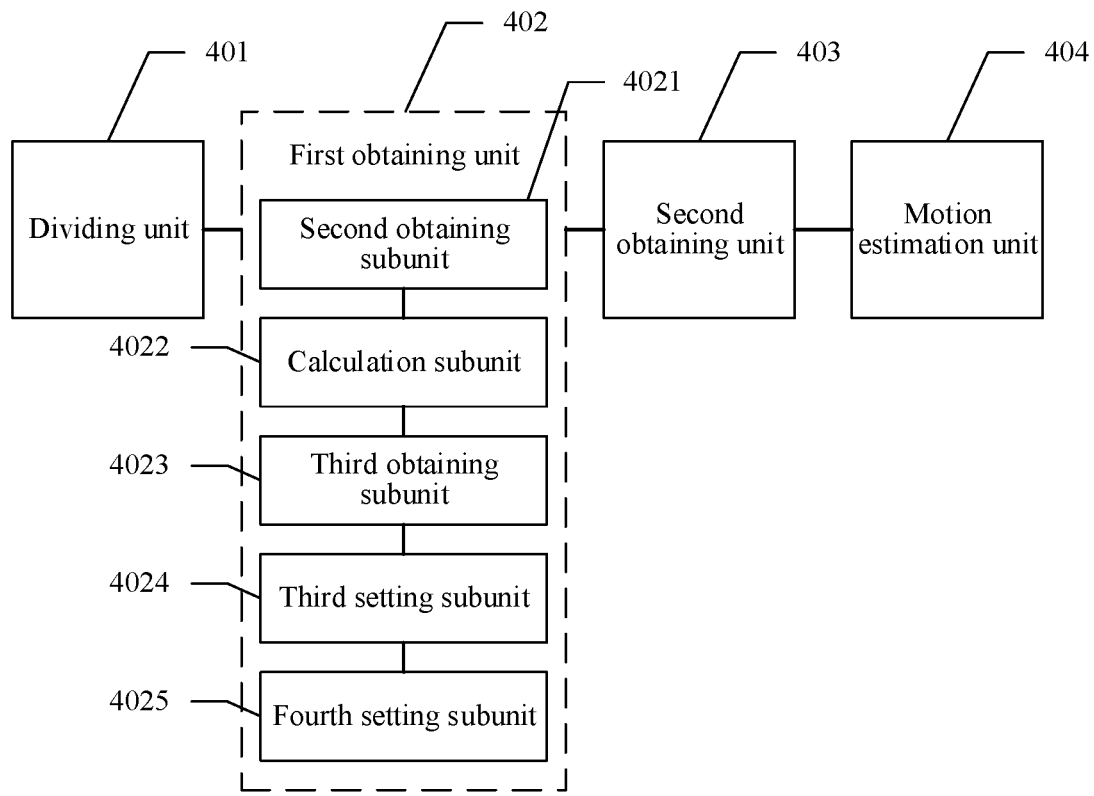
FIG. 14 is another schematic structural diagram of a video motion estimation apparatus according to an exemplary embodiment of the present disclosure.

In exemplary embodiments, as shown in FIG. 14, the first obtaining unit 402 may include a second obtaining subunit 4021, a calculation subunit 4022, a third obtaining subunit 4023, a third setting subunit 4024, a fourth setting subunit 4025, and the like, which are described below.

The second obtaining subunit 4021 includes circuitry configured to obtain a second candidate starting search point corresponding to the first type of prediction unit, calculate rate-distortion cost of each second candidate starting search point, and set a second candidate starting search point with the minimum rate-distortion cost as a second starting search point.

The calculation subunit 4022 includes circuitry configured to obtain, according to the second preset increasing step size, a plurality of second candidate points within the search window range centered on the second starting search point, calculate rate-distortion cost of each second candidate point, and select a point with the minimum rate-distortion cost from the plurality of second candidate points, to obtain a second undetermined point.

The third obtaining subunit 4023 includes circuitry configured to obtain a second supplementary point not searched around each point corresponding to the second preset step size, and calculate rate-distortion cost of the second supplementary point in a case that the search step size corresponding to the second undetermined point is a second preset step size.

The third setting subunit 4024 includes circuitry configured to set a location of the second undetermined point as the motion vector of the first type of prediction unit in a case that the point with the minimum rate-distortion cost in the second undetermined point and the second supplementary point is the second undetermined point.

The fourth setting subunit 4025 includes circuitry configured to set the second undetermined point as the second starting search point when the point with the minimum rate-distortion cost in the second undetermined point and the second supplementary point is not the second undetermined point, and the calculation subunit performs the operation of obtaining, according to the second preset increasing step size, a plurality of second candidate points within the search window range centered on the second starting search point, calculating the rate-distortion cost of each second candidate point, and selecting the point with the minimum rate-distortion cost from the plurality of second candidate points, to obtain the second undetermined point.

For specific descriptions of the functions performed by the second obtaining subunit 4021, the calculation subunit 4022, the third obtaining subunit 4023, the third setting subunit 4024, and the fourth setting subunit 4025, reference may be made to the exemplary embodiment described for the operation of obtaining the motion vector of the first type of prediction unit according to the first search algorithm.

Optionally, the third setting subunit 4024 includes circuitry configured to obtain a motion vector of a searched prediction unit in the image frame, and calculate second target rate-distortion cost of a corresponding location of the first type of prediction unit according to the motion vector of the searched prediction unit. The circuitry is also configured to compare a rate-distortion cost of the second undetermined point with the second target rate-distortion cost. The circuitry is further configured to set the motion vector of the searched prediction unit as the motion vector of the first type of prediction unit in a case that the rate-distortion cost of the second undetermined point is greater than the second target rate-distortion cost. The circuitry is further configured to set the location of the second undetermined point as the motion vector of the first type of prediction unit in a case that the rate-distortion cost of the second undetermined point is less than or equal to the second target rate-distortion cost.

For specific descriptions of the functions performed by the third setting subunit 4024, reference may be made to the exemplary embodiment described for the operation of setting the location of the second undetermined point as the motion vector of the first type of prediction unit.

Optionally, the second type of prediction unit includes a third dividing block and a fourth dividing block. The second obtaining subunit 4021 includes circuitry configured to obtain at least one second candidate starting search point corresponding to the fourth dividing block in the first type of prediction unit through advanced motion vector prediction. The circuitry is also configured to obtain a prediction result of the third dividing block, calculate rate-distortion cost of each second candidate starting search point, and calculate rate-distortion cost of a location of the third dividing block according to the prediction result of the third dividing block in a case that the third dividing block in the first type of prediction unit is predicted. The circuitry is further configured to set the point with the minimum rate-distortion cost in the at least one second candidate starting search point and the third dividing block as the starting search point of the fourth dividing block in the first type of prediction unit, and set the starting search point of the fourth dividing block as the second starting search point.

For specific descriptions of the second obtaining subunit 4021, reference may be made to the exemplary embodiment described for the operation of obtaining a second candidate starting search point corresponding to the first type of prediction unit, calculating rate-distortion cost of each second candidate starting search point, and setting a second candidate starting search point with the minimum rate-distortion cost as a second starting search point.

In exemplary embodiments, the first obtaining unit 402 may further include a search subunit including circuitry configured to perform searching, according to a preset interval step size, within a preset range centered on the second undetermined point in a case that the search step size corresponding to the second undetermined point is within a third preset step size threshold range, to obtain a plurality of search points, and calculate rate-distortion cost of each search point. The first obtaining unit 402 may also include a first execution subunit including circuitry configured to use the point with the minimum rate-distortion cost in the second undetermined point and the plurality of search points as the second starting search point, a calculation subunit performing the operation of obtaining, according to the second preset increasing step size, a plurality of second candidate points within the search window range centered on the second starting search point, calculating the rate-distortion cost of each second candidate point, and selecting the point with the minimum rate-distortion cost from the plurality of second candidate points, to obtain a second undetermined point. For specific implementation of the search subunit and the first execution subunit, reference may be made to the embodiment described when the search step size corresponding to the second undetermined point is within the third preset step size threshold range.

In exemplary embodiments, the first obtaining unit 402 may further include a second execution subunit including circuitry configured to use the second undetermined point as the second starting search point, a calculation subunit performing the operation of obtaining, according to the second preset increasing step size, a plurality of second candidate points within the search window range centered on the second starting search point, calculating the rate-distortion cost of each second candidate point, and selecting the point with the minimum rate-distortion cost from the plurality of second candidate points, to obtain a second undetermined point in a case that a search step size corresponding to the second undetermined point is within a fourth preset step size threshold range.

For specific descriptions of the functions performed by the second execution subunit, reference may be made to the exemplary embodiment described when the search step size corresponding to the second undetermined point is within the fourth preset step size threshold range.

The second obtaining unit 403 includes circuitry that is configured to obtain a motion vector of the second type of prediction unit according to a second search algorithm.

Figure 13:
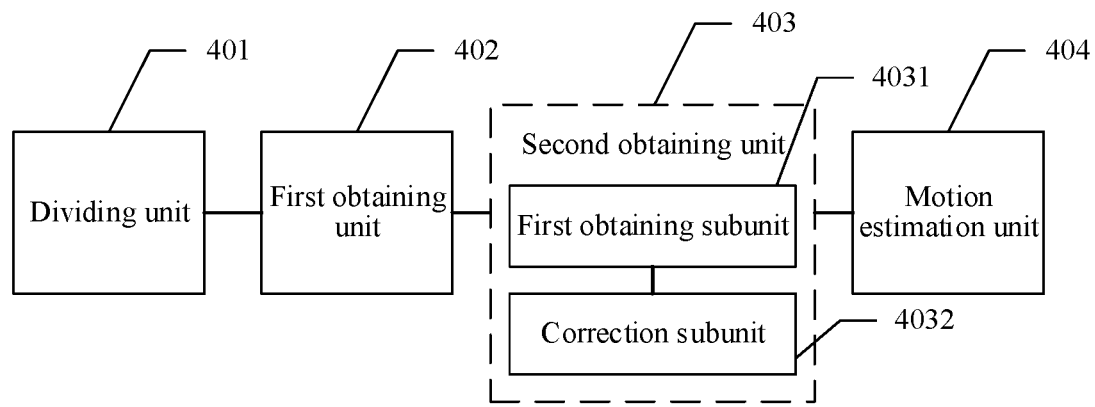
FIG. 13 is another schematic structural diagram of a video motion estimation apparatus according to an exemplary embodiment of the present disclosure.

In exemplary embodiments, as shown in FIG. 13, the second obtaining unit 403 may include a first obtaining subunit 4031 and a correction subunit 4032, and the like, which may be specifically described below.

The first obtaining subunit 4031 includes circuitry configured to obtain a polygonal model according to the second search algorithm, and obtain a current motion vector of the second type of prediction unit by moving the polygonal model.

The correction subunit 4032 includes circuitry configured to obtain a motion vector of a searched prediction unit in an image frame, and correct the current motion vector according to the motion vector of the searched prediction unit, to obtain the motion vector of the second type of prediction unit.

For specific descriptions of the functions performed by the second obtaining unit 403, reference may be made to the exemplary embodiment described in step S103.

In exemplary embodiments, the first obtaining subunit 4031 may include a search module including circuitry configured to obtain a first undetermined point in the second type of prediction unit according to the second search algorithm, and an obtaining module including circuitry configured to obtain a polygonal model centered on the first undetermined point, and obtain a first target point according to the polygonal model in a case that a search step size of the first undetermined point is within a first preset step size threshold range. The first obtaining subunit 4031 may also include a mobile module including circuitry configured to move the polygonal model, and obtain an optimal point according to the moved polygonal model in a case that the first target point is inconsistent with the first undetermined point, and a first setting module including circuitry configured to set a location of the optimal point as the current motion vector of the second type of prediction unit in a case that the optimal point is consistent with the first target point.

For specific descriptions of the functions performed by the search module, the obtaining module, and the mobile module, reference may be made to the exemplary embodiment described for the operation of obtaining a polygonal model according to the second search algorithm, and obtaining a current motion vector of the second type of prediction unit by moving the polygonal model.

Optionally, the mobile module may include circuitry configured to move a center of the polygonal model to a location of the first target point in a case that the first target point is inconsistent with the first undetermined point, and select a point with the minimum rate-distortion cost from the center of the moved polygonal model and each vertex, to obtain an optimal point.

For specific descriptions of the functions performed by the mobile module, reference may be made to the exemplary embodiment described for the operation of moving the polygonal model, and obtaining an optimal point according to the moved polygonal model in a case that the first target point is inconsistent with the first undetermined point.

Optionally, the first obtaining subunit 4031 may further include a second setting module including circuitry configured to set a location of the first target point as the current motion vector of the second type of prediction unit in a case that the first target point is consistent with the first undetermined point.

In exemplary embodiments, the search module may include a search submodule including circuitry configured to obtain a point with the minimum rate-distortion cost in the second type of prediction unit according to the second search algorithm, to obtain the first undetermined point.

The obtaining module may include circuitry configured to obtain a polygonal model centered on the first undetermined point in a case that a search step size corresponding to the first undetermined point is within a first preset step size threshold range, and select a point with the minimum rate-distortion cost from a midpoint of the polygonal model and each vertex, to obtain the first target point.

For specific descriptions of the functions performed by the search module and the obtaining module, reference may be made to the exemplary embodiment described for the operation of obtaining a first undetermined point in the second type of prediction unit according to the second search algorithm, obtaining a polygonal model centered on the first undetermined point, and obtaining a first target point according to the polygonal model in a case that a search step size of the first undetermined point is within a first preset step size threshold range.

Optionally, the search submodule may include circuitry configured to obtain a first candidate starting search point corresponding to the second type of prediction unit according to the second search algorithm, calculate rate-distortion cost of each first candidate starting search point, and set the first candidate starting search point with the minimum rate-distortion cost as a first starting search point. The circuitry may also be configured to obtain, according to a first preset increasing step size, a plurality of first candidate points within a search window range centered on the first starting search point, and select a point with minimum rate-distortion cost from the plurality of first candidate points, to obtain the first undetermined point.

For specific descriptions of the functions performed by the search submodule, reference may be made to the exemplary embodiment described for the operation of obtaining a point with the minimum rate-distortion cost in the second type of prediction unit according to the second search algorithm, to obtain the first undetermined point.

In exemplary embodiments, the second type of prediction unit includes a first dividing block and a second dividing block. The search submodule includes circuitry configured to obtain at least one first candidate starting search point corresponding to the second dividing block in the second type of prediction unit through advanced motion vector prediction according to the second search algorithm. The circuitry is also configured to obtain a prediction result of the first dividing block, calculate rate-distortion cost of each first candidate starting search point, and calculate rate-distortion cost of a location of the first dividing block according to the prediction result of the first dividing block in a case that the first dividing block in the second type of prediction unit is predicted. The circuitry is further configured to obtain the point with the minimum rate-distortion cost from the least one first candidate starting search point and the first dividing block, and set the obtained point with the minimum rate-distortion cost as a starting search point of the second dividing block in the second type of prediction unit, and set the starting search point of the second dividing block as the first starting search point.

For specific descriptions of the functions performed by the first dividing block, the second dividing block, and the search submodule, reference may be made to the exemplary embodiment described for the operation of obtaining a first candidate starting search point corresponding to the second type of prediction unit according to the second search algorithm, calculating rate-distortion cost of each first candidate starting search point, and setting a first candidate starting search point with the minimum rate-distortion cost as a first starting search point.

In exemplary embodiments, the obtaining module may include circuitry configured to obtain a first supplementary point not searched around each point corresponding to the first preset step size, and calculate rate-distortion cost of the first supplementary point in a case that the search step size corresponding to the first undetermined point is a first preset step size. The circuitry may also be configured to set a location of the first undetermined point as a current motion vector of the second type of prediction unit in a case that the point with the minimum rate-distortion cost in the first undetermined point and the first supplementary point is the first undetermined point. The circuitry may further be configured to set a location of the point with the minimum rate-distortion cost in the first undetermined point and the first supplementary point as a current motion vector of the second type of prediction unit in a case that the point with the minimum rate-distortion cost in the first undetermined point and the first supplementary point is not the first undetermined point.

For specific descriptions of the functions performed by the obtaining module, reference may be made to the exemplary embodiment described after the operation of obtaining a point with the minimum rate-distortion cost in the second type of prediction unit according to the second search algorithm, to obtain the first undetermined point.

In exemplary embodiments, the obtaining module may include circuitry configured to set the first undetermined point as a first starting search point, and perform the operation of obtaining, according to a first preset increasing step size, a plurality of first candidate points within a search window range centered on the first starting search point in a case that the search step size corresponding to the first undetermined point is within a second preset step size threshold range.

In exemplary embodiments, the correction subunit 4032 may include circuitry configured to obtain a motion vector of a searched prediction unit in the image frame, and calculate first target rate-distortion cost of a corresponding location of the second type of prediction unit according to the motion vector of the searched prediction unit. The circuitry may also be configured to determine current rate-distortion cost of the second type of prediction unit according to the current motion vector of the second type of prediction unit, and compare the current rate-distortion cost of the second type of prediction unit with the first target rate-distortion cost. The circuitry may be further configured to set the motion vector of the searched prediction unit as the motion vector of the second type of prediction unit in a case that the current rate-distortion cost of the second type of prediction unit is greater than the first target rate-distortion cost, and set a location of a point corresponding to the current rate-distortion cost as the motion vector of the second type of prediction unit in a case that the current rate-distortion cost of the second type of prediction unit is less than or equal to the first target rate-distortion cost.

For specific descriptions of the functions performed by the correction subunit 4032, reference may be made to the exemplary embodiment described for the operation of obtaining a motion vector of a searched prediction unit in an image frame, and correcting the current motion vector according to the motion vector of the searched prediction unit, to obtain the motion vector of the second type of prediction unit.

The motion estimation unit 404 includes circuitry configured to perform sub-pixel motion estimation on the image frame according to the motion vector of the first type of prediction unit and the motion vector of the second type of prediction unit.

For specific descriptions of the functions performed by the motion estimation unit 404, reference may be made to the exemplary embodiment described for step S104.

Figure 15:
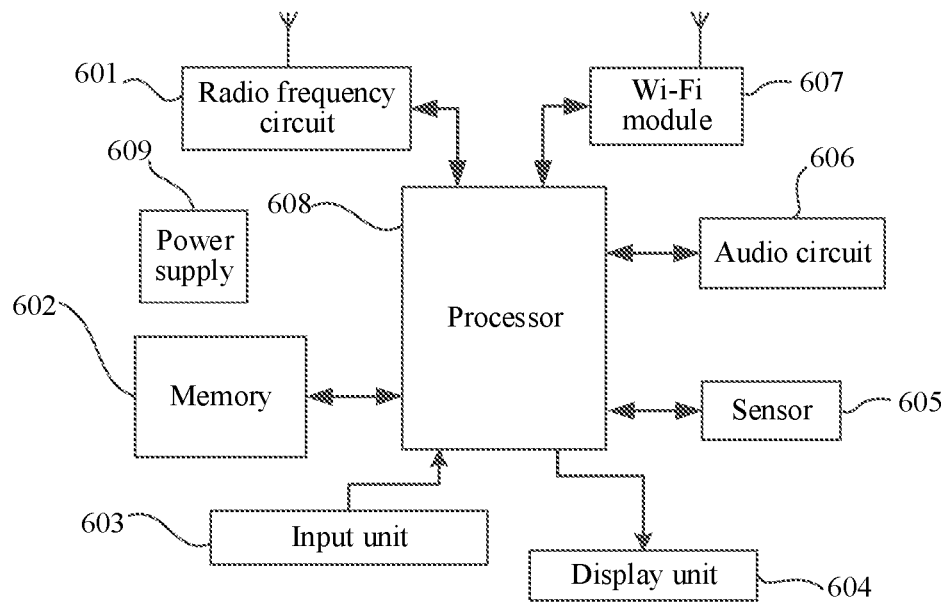
FIG. 15 is a schematic structural diagram of a terminal according to an embodiment of this application.

An exemplary embodiment of this application further provides a terminal. As shown in FIG. 15, the terminal may include circuit components such as a radio frequency (RF) circuit 601, a memory 602 including one or more non-transitory computer readable storage media, an input unit, or circuit, 603, a display unit, or circuit, 604, a sensor 605, an audio circuit 606, a WiFi module, or circuit, 607, a processor 608 including one or more processing cores, a power supply 609, and the like. A person skilled in the art will recognize that the terminal structure illustrated in FIG. 15 is merely exemplary, and other terminals having more, fewer, or different circuit components are possible without departing from the scope of the present disclosure.

The RF circuit 601 may be configured to receive and send a signal during the sending and receiving of information or during a call. In particular, downlink information of a base station is processed by one or more processors 608 after being received. In addition, uplink data is sent to the base station. The RF circuit 601 may include, but is not limited to, an antenna, at least one amplifier, a tuner, one or more oscillators, a subscriber identity module (SIM) card, a transceiver, a coupler, a low noise amplifier (LNA), duplexer, and the like. In addition, the RF circuit 601 may further communicate with other devices via wireless communication and a network. The wireless communication may use any communication standard or protocol, including but not limited to the Global System of Mobile Communication (GSM), general packet radio service (GPRS), and Code Division Multiple Access (CDMA), Wideband Code Division Multiple Access (WCDMA), Long Term Evolution (LTE), email, short messaging service (SMS), and the like.

The memory 602 may be configured to store a computer readable instruction and a module, and the processor 608 executes various function applications and performs data processing by running the computer readable instruction and the module that are stored in the memory 602. The memory 602 may include a computer readable instruction storage area and a data storage area, where the computer readable instruction storage area may store an operating system, an application required for at least one function (such as a sound playback function, an image playback function, and the like), and the like. The data storage area may store data (such as audio data, a phone book, and the like) created according to the use of the terminal, and the like. In addition, the memory 602 may include non-transitory computer-readable media, such as a high speed random access memory, non-volatile memory, such as at least one magnetic disk storage device, a flash memory device or other non-volatile solid state storage devices. Accordingly, the memory 602 may further include a memory controller circuit to provide access to the memory 602 by the processor 608 and the input unit 603.

The input unit, or circuit, 603 may be configured to receive information about an input number or character, and generate input of a keyboard, a mouse, a joystick, an optical or trackball signal that are related to user settings and function control. Specifically, in a specific embodiment, the input unit, or circuit, 603 may include a touch-sensitive surface and other input devices. The touch-sensitive surface is also referred to as a touch screen or a touchpad, which may collect a touch operation (for example, an operation on the touch-sensitive surface or near the touch-sensitive surface by a user by using any suitable object or accessory such as a finger, a stylus, and the like) on the touch-sensitive surface or near the touch-sensitive surface, and drive a corresponding connection apparatus according to a preset program. Optionally, the touch-sensitive surface may include a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into a contact coordinate, then sends the contact coordinate to the processor 608, receives and executes a command sent by the processor 608. In addition, a variety of types such as resistive, capacitive, infrared, and surface acoustic waves may be used for implementing the touch-sensitive surface. Except the touch-sensitive surface, the input unit, or circuit, 603 may further include other input devices. Specifically, other input devices may include but are not limited to one or more of a physical keyboard, a function key (such as a volume control key, a switch key, and the like), a trackball, a mouse, a joystick, and the like.

The display unit, or circuit, 604 may be configured to display information input by the user or provided to the user, and various graphical user interfaces of the terminal. These graphical user interfaces may be composed of graphics, text, icons, videos, and any combination thereof. The display unit, or circuit, 604 may include a display panel. Alternatively, the display panel may be configured in the form of a liquid crystal display (LCD), an organic light-emitting diode (OLED), or the like. Further, the touch-sensitive surface may cover the display panel. After the touch-sensitive surface detects a touch operation on the touch-sensitive surface or near the touch-sensitive surface, the touch operation is transmitted to the processor 608 to determine a type of a touch event, and then the processor 608 provides corresponding visual output on the display panel according to the type of the touch event. Although in FIG. 15, the touch-sensitive surface and the display panel are used as two independent components to implement the input and input functions, but in some embodiments, the touch-sensitive surface and the display panel may be integrated to implement the input and output functions.

The terminal may further include at least one sensor 605, such as an optical sensor, a motion sensor, and other sensor circuits. Specifically, the optical sensor may include an ambient light sensor and a proximity sensor, where the ambient light sensor may adjust brightness of the display panel according to brightness of the ambient light, and the proximity sensor may turn off the display panel and/or backlight when the terminal moves to an ear. As one type of the motion sensor, a gravity acceleration sensor may detect a magnitude of acceleration in various directions (generally three axes), and may detect a magnitude and a direction of gravity when static, which may be configured to recognize application of mobile phone gestures (such as horizontal and vertical screen switching, related games, and magnetometer posture calibration), vibration recognition related functions (such as pedometer and tap), and the like. For other sensors such as a gyro, a barometer, a hygrometer, a thermometer, an infrared sensor, and the like that may further be configured on the terminal, details are not described herein again.

The audio circuit 606, a speaker, and a microphone may provide an audio interface between the user and the terminal. The audio circuit 606 may transmit, to the speaker, an electrical signal obtained through conversion of the received audio data, and the speaker converts the electrical signal into a sound signal to be output. According to another aspect, the microphone converts the collected sound signal into an electrical signal, the electrical signal is converted into audio data after received by the audio circuit 606, and the audio data is sent to another terminal via the RF circuit 601 after being output to the processor 608 for processing, or the audio data is output to the memory 602 for further processing. The audio circuit 606 may further include an earplug jack to provide communication between a peripheral headset and the terminal.

WiFi is a short-range wireless transmission technology. The terminal may help users send and receive an email, browse a webpage, and access streaming media through the WiFi module, or circuit, 607, which provides users with access to the wireless broadband Internet. Although FIG. 15 shows the WiFi module, or circuit, 607, it may be understood that the WiFi module, or circuit, 607 does not belong to mandatory configuration of the terminal, and may be omitted as needed without changing the scope of the essence of this application.

The processor 608 is a control center of the terminal, which connects various parts of the entire mobile phone by using various interfaces and lines, perform various functions of the terminal and process data by running or executing the computer readable instruction and/or modules stored in the memory 602, and calling data stored in the memory 602, thereby performing overall monitoring on the mobile phone. Optionally, the processor 608 may include one or more processing cores. Preferably, the processor 608 may integrate circuitry such as an application processor and a modem processor, where the application processor mainly processes an operating system, a user interface, an application program, and the like, and the modem processor mainly processes wireless communication. It may be understood that the foregoing modem processor may not be integrated into the processor 608.

The terminal further includes a power supply 609 (such as a battery) that supplies power to various components. The power supply may be logically connected to the processor 608 through a power management system, so that functions such as charging, discharging, and power management may be managed through the power management system. The power supply 609 may further include any component such as one or more DC or AC power supplies, a recharging system, a power failure detection circuit, a power converter or inverter, a power status indicator, and the like.

Although not shown, the terminal may further include a camera, a Bluetooth module, and the like, and details are not described herein again. Specifically, in an exemplary embodiment, the processor 608 in the terminal loads executable files corresponding to processes of one or more application programs into the memory 602 according to the following computer readable instruction, and the processor 608 runs the application programs stored in the memory 602, thereby implementing functions including dividing image frames in a video into a plurality of prediction units, and dividing the plurality of prediction units into a first type of prediction unit and a second type of prediction unit; obtaining a motion vector of the first type of prediction unit according to a first search algorithm; obtaining a motion vector of the second type of prediction unit according to a second search algorithm; and performing sub-pixel motion estimation on the image frame according to the motion vector of the first type of prediction unit and the motion vector of the second type of prediction unit.

Optionally, the operation of obtaining a motion vector of the second type of prediction unit according to a second search algorithm may include obtaining a polygonal model according to the second search algorithm, and obtaining a current motion vector of the second type of prediction unit by moving the polygonal model; and obtaining a motion vector of a searched prediction unit in an image frame, and correcting the current motion vector according to the motion vector of the searched prediction unit, to obtain the motion vector of the second type of prediction unit.

Optionally, the operation of obtaining a polygonal model according to the second search algorithm, and obtaining a current motion vector of the second type of prediction unit by moving the polygonal model may include obtaining a first undetermined point in the second type of prediction unit according to the second search algorithm; obtaining a polygonal model centered on the first undetermined point, and obtaining a first target point according to the polygonal model in a case that a search step size of the first undetermined point is within a first preset step size threshold range; moving the polygonal model, and obtaining an optimal point according to the moved polygonal model in a case that the first target point is inconsistent with the first undetermined point; and setting a location of the optimal point as the current motion vector of the second type of prediction unit in a case that the optimal point is consistent with the first target point.

Optionally, the operation of obtaining a motion vector of a searched prediction unit in an image frame, and correcting the current motion vector according to the motion vector of the searched prediction unit, to obtain the motion vector of the second type of prediction unit may include obtaining a motion vector of a searched prediction unit in the image frame, and calculating first target rate-distortion cost of a corresponding location of the second type of prediction unit according to the motion vector of the searched prediction unit; determining current rate-distortion cost of the second type of prediction unit according to the current motion vector of the second type of prediction unit; comparing the current rate-distortion cost of the second type of prediction unit with the first target rate-distortion cost; setting the motion vector of the searched prediction unit as the motion vector of the second type of prediction unit in a case that the current rate-distortion cost of the second type of prediction unit is greater than the first target rate-distortion cost; and setting a location of a point corresponding to the current rate-distortion cost as the motion vector of the second type of prediction unit in a case that the current rate-distortion cost of the second type of prediction unit is less than or equal to the first target rate-distortion cost.

For specific descriptions of the foregoing functions, reference may be made to the previous exemplary embodiments.

Accordingly, image frames in a video may be divided into a plurality of prediction units, and the plurality of prediction units are classified. For example, the plurality of prediction units is divided into a first type of prediction unit and a second type of prediction unit. For different types of prediction units, motion vectors of different types of prediction units are obtained by using different search algorithms. For example, a motion vector of the first type of prediction unit is obtained according to a first search algorithm, and a motion vector of the second type of prediction unit is obtained according to a second search algorithm. Subsequently, sub-pixel motion estimation may be performed on the image frame according to the motion vector of the first type of prediction unit and the motion vector of the second type of prediction unit. Accordingly, a plurality of prediction units may be classified, and the motion vectors of different types of prediction units are obtained by using different search algorithms, which leads to relatively high search efficiency. Therefore, in comparison to the same processing method used for different prediction units in the related art, efficiency and flexibility of performing motion estimation on the video are improved.

A person skilled will recognize that all or part of the steps in the various methods of the foregoing exemplary embodiments may be performed by using the computer readable instructions or performed by using the computer readable instructions to control related hardware. The computer readable instructions may be stored in a non-transitory computer readable storage medium, loaded and executed by the processor.

Accordingly, an exemplary embodiment of the present disclosure provides a non-transitory computer readable storage medium storing a plurality of computer readable instructions, and the computer readable instructions can be loaded by a processor to perform the operations in any one of the video motion estimation methods according to the exemplary embodiments described herein. For example, the computer readable instructions may cause the processor to perform the steps including dividing image frames in a video into a plurality of prediction units, and dividing the plurality of prediction units into a first type of prediction unit and a second type of prediction unit; obtaining a motion vector of the first type of prediction unit according to a first search algorithm; obtaining a motion vector of the second type of prediction unit according to a second search algorithm; and performing sub-pixel motion estimation on the image frame according to the motion vector of the first type of prediction unit and the motion vector of the second type of prediction unit.

Optionally, the operation of obtaining a motion vector of the second type of prediction unit according to a second search algorithm may include: obtaining a polygonal model according to the second search algorithm, and obtaining a current motion vector of the second type of prediction unit by moving the polygonal model; and obtaining a motion vector of a searched prediction unit in an image frame, and correcting the current motion vector according to the motion vector of the searched prediction unit, to obtain the motion vector of the second type of prediction unit.

Optionally, the operation of obtaining a polygonal model according to the second search algorithm, and obtaining a current motion vector of the second type of prediction unit by moving the polygonal model may include obtaining a first undetermined point in the second type of prediction unit according to the second search algorithm; obtaining a polygonal model centered on the first undetermined point, and obtaining a first target point according to the polygonal model in a case that a search step size of the first undetermined point is within a first preset step size threshold range; moving the polygonal model, and obtaining an optimal point according to the moved polygonal model in a case that the first target point is inconsistent with the first undetermined point; and setting a location of the optimal point as the current motion vector of the second type of prediction unit in a case that the optimal point is consistent with the first target point.

For specific descriptions of the foregoing functions, reference may be made to the previous exemplary embodiments.

The non-transitory computer readable medium may include a read-only memory (ROM), a random access memory (RAM), a magnetic disk, an optical disc, or the like.

Since the computer readable instructions stored in the non-transitory computer readable medium may cause a processor to perform the steps of any video motion estimation method in the exemplary embodiments of the present disclosure, the instructions can implement advantageous effects that may be implemented by any video motion estimation method in the exemplary embodiments described herein.

The video motion estimation method, the apparatus, and the system described in the exemplary embodiments of the present disclosure are described above in detail. Although the principles of the present disclosure are described by using specific examples, the descriptions of the foregoing exemplary embodiments are merely intended to help understand the concepts of the disclosure. Therefore, a person skilled in the art will recognize that modifications to the described exemplary embodiments, and other embodiments are possible without departing from the scope of the present disclosure.

What is claimed is:

1. A video motion estimation method, performed by a terminal, comprising:
   dividing, with circuitry of the terminal, an image frame of a video into a plurality of prediction units;
   dividing the plurality of prediction units into a first type of prediction units and a second type of prediction units;
   obtaining, with the circuitry, a motion vector of a first prediction unit of the first type according to a first search algorithm;
   obtaining, with the circuitry, a motion vector of a prediction unit of the second type according to a second search algorithm, the second search algorithm being different from the first search algorithm; and
   performing, with the circuitry, sub-pixel motion estimation on the image frame according to the motion vector of the prediction unit of the first type and the motion vector of the prediction unit of the second type to generate a motion estimate result.

2. The video motion estimation method according to claim 1, wherein the obtaining of the motion vector of the prediction unit of the second type includes:
   obtaining a polygonal model according to the second search algorithm, and obtaining a current motion vector of the prediction unit of the second type by moving the polygonal model; and
   obtaining a motion vector of a searched prediction unit in the image frame, and correcting the current motion vector according to the motion vector of the searched prediction unit, to obtain the motion vector of the prediction unit of the second type.

3. The video motion estimation method according to claim 2, wherein the obtaining the polygonal model includes:
   obtaining a first undetermined point in the prediction unit of the second typet according to the second search algorithm;
   obtaining a polygonal model centered on the first undetermined point, and obtaining a first target point according to the polygonal model in a case that a search step size of the first undetermined point is within a first preset step size threshold range;
   setting a location of the first target point as the current motion vector of the prediction unit of the second type in a case that the first target point is consistent with the first undetermined point; and
   moving the polygonal model, and obtaining an optimal point according to the moved polygonal model in a case that the first target point is inconsistent with the first undetermined point, and setting a location of the optimal point as the current motion vector of prediction unit of the second type in a case that the optimal point is consistent with the first target point.

4. The video motion estimation method according to claim 3, wherein the moving the polygonal model includes:
   moving a center of the polygonal model to a location of the first target point in a case that the first target point is inconsistent with the first undetermined point; and
   selecting a point with minimum rate-distortion cost from the center of the moved polygonal model and each vertex, to obtain the optimal point.

5. The video motion estimation method according to claim 3, wherein the obtaining the first undetermined point includes:
   obtaining a point the minimum rate-distortion cost in the prediction unit of the second type according to the second search algorithm, to obtain the first undetermined point;
   obtaining the polygonal model centered on the first undetermined point in a case that a search step size corresponding to the first undetermined point is within the first preset step size threshold range; and
   selecting a point with the minimum rate-distortion cost from a midpoint of the polygonal model and each vertex, to obtain the first target point.

6. The video motion estimation method according to claim 5, wherein the obtaining the point with the minimum rate-distortion cost in the prediction unit of the second type includes:
   obtaining a first candidate starting search point corresponding to the prediction unit of the second type according to the second search algorithm;
   calculating rate-distortion cost of each first candidate starting search point, and setting the first candidate starting search point with the minimum rate-distortion cost as a first starting search point;
   obtaining, according to a first preset increasing step size, a plurality of first candidate points within a search window range centered on the first starting search point; and
   selecting a point with minimum rate-distortion cost from the plurality of first candidate points, to obtain the first undetermined point.

7. The video motion estimation method according to claim 6, wherein the prediction unit of the second type includes a first dividing block and a second dividing block, and the obtaining the first candidate starting search point includes:

obtaining a first candidate starting search point corresponding to the second dividing block in the prediction unit of the second type through advanced motion vector prediction according to the second search algorithm;

obtaining a prediction result of the first dividing block, calculating a rate-distortion cost of each first candidate starting search point, and calculating a rate-distortion cost of a location of the first dividing block according to the prediction result of the first dividing block in a case that the first dividing block in the prediction unit of the second type unit is predicted;

obtaining the point with the minimum rate-distortion cost from the first candidate starting search point and the first dividing block; and setting the obtained point with the minimum rate-distortion cost as the starting search point of the second dividing block in the prediction unit of the second type, and setting the starting search point of the second dividing block as the first starting search point.

8. The video motion estimation method according to claim 5, wherein after the obtaining the point with the minimum rate-distortion cost in the prediction unit of the second type, the method further comprises:

obtaining a first supplementary point not searched around each point corresponding to the first preset step size, and calculating a rate-distortion cost of the first supplementary point in a case that the search step size corresponding to the first undetermined point is a first preset step size;

setting a location of the first undetermined point as a current motion vector of the prediction unit of the second type in a case that the point with the minimum rate-distortion cost in the first undetermined point and the first supplementary point is the first undetermined point; and setting a location of the point with the minimum rate-distortion cost in the first undetermined point and the first supplementary point as a current motion vector of the prediction unit of the second type in a case that the point with the minimum rate-distortion cost in the first undetermined point and the first supplementary point is not the first undetermined point.

9. The video motion estimation method according to claim 5, wherein after the obtaining the point with the minimum rate-distortion cost in the prediction unit of the second type, the method further comprises:

setting the first undetermined point as a first starting search point, and performing the operation of obtaining, according to a first preset increasing step size, a plurality of first candidate points within a search window range centered on the first starting search point in a case that the search step size corresponding to the first undetermined point is within a second preset step size threshold range.

10. The video motion estimation method according to claim 2, wherein the obtaining the motion vector of a searched prediction unit in the image frame includes:

obtaining the motion vector of the searched prediction unit in the image frame, and calculating first target rate-distortion cost of a corresponding location of the prediction unit of the second type according to the motion vector of the searched prediction unit;

determining current rate-distortion cost of the prediction unit of the second type unit according to the current motion vector of the prediction unit of the second type;

comparing the current rate-distortion cost of the prediction unit of the second type with the first target rate-distortion cost;

setting the motion vector of the searched prediction unit as the motion vector of the prediction unit of the second type in a case that the current rate-distortion cost of the prediction unit of the second type is greater than the first target rate-distortion cost; and setting a location of a point corresponding to the current rate-distortion cost as the motion vector of the prediction unit of the second type in a case that the current rate-distortion cost of the prediction unit of the second type is less than or equal to the first target rate-distortion cost.

11. The video motion estimation method according to claim 1, wherein the operation of obtaining a motion vector of the prediction unit of the first type according to a first search algorithm comprising:

obtaining a second candidate starting search point corresponding to the prediction unit of the first type, calculating rate-distortion cost of each second candidate starting search point, and setting a second candidate starting search point with the minimum rate-distortion cost as a second starting search point;

obtaining, according to the second preset increasing step size, a plurality of second candidate points within the search window range centered on the second starting search point, calculating the rate-distortion cost of each second candidate point, and selecting the point with the minimum rate-distortion cost from the plurality of second candidate points, to obtain a second undetermined point;

obtaining a second supplementary point not searched around each point corresponding to the second preset step size, and calculating a rate-distortion cost of the second supplementary point in a case that the search step size corresponding to the second undetermined point is a second preset step size;

setting a location of the second undetermined point as the motion vector of the prediction unit of the first type in a case that a point with minimum rate-distortion cost in the second undetermined point and the second supplementary point is the second undetermined point; and setting a location of the point with the minimum rate-distortion cost in the second undetermined point and the second supplementary point as the motion vector of the prediction unit of the first type in a case that the point with the minimum rate-distortion cost in the second undetermined point and the second supplementary point is not the second undetermined point.

12. The video motion estimation method according to claim 11, wherein the operation of setting the location of the second undetermined point as the motion vector of the prediction unit of the first type includes:

obtaining the motion vector of the searched prediction unit in the image frame, and calculating a second target rate-distortion cost of a corresponding location of the prediction unit of the first type according to the motion vector of the searched prediction unit;

comparing the rate-distortion cost of the second undetermined point with the second target rate-distortion cost;

setting the motion vector of the searched prediction unit as the motion vector of the prediction unit of the first type in a case that the rate-distortion cost of the second undetermined point is greater than the second target rate-distortion cost; and setting the location of the second undetermined point as the motion vector of the prediction unit of the first type in a case that the rate-distortion cost of the second undetermined point is less than or equal to the second target rate-distortion cost.

13. The video motion estimation method according to claim 11, wherein the prediction unit of the first type includes a third dividing block and a fourth dividing block, and the operation of obtaining a second candidate starting search point corresponding to the prediction unit of the first type includes:

obtaining a second candidate starting search point corresponding to the fourth dividing block in the prediction unit of the first type through advanced motion vector prediction;

obtaining a prediction result of the third dividing block, calculating a rate-distortion cost of each second candidate starting search point, and calculating a rate-distortion cost of a location of the third dividing block according to the prediction result of the third dividing block in a case that the third dividing block in the first type of prediction unit is predicted; and setting the point with the minimum rate-distortion cost as the starting search point of the fourth dividing block in the prediction unit of the first type from the second candidate starting search point and the third dividing block, and setting the starting search point of the fourth dividing block as the second starting search point.

14. A video motion estimation apparatus, comprising: circuitry configured to:

divide an image frame of a video into a plurality of prediction units, and divide the plurality of prediction units into a first type of prediction units and a second type of prediction units;

obtain a motion vector of a prediction unit of the first type according to a first search algorithm;

obtain a motion vector of a prediction unit of the second type according to a second search algorithm, the second search algorithm being different from the first search algorithm; and perform sub-pixel motion estimation on the image frame according to the motion vector of the prediction unit of the first type and the motion vector of the prediction unit of the second type to generate a motion estimate result.

15. The video motion estimation apparatus according to claim 14, wherein to obtain the motion vector of the prediction unit of the second type, the circuitry is further configured to:

obtain a polygonal model according to the second search algorithm, and obtain a current motion vector of the prediction unit of the second type by moving the polygonal model; and obtain a motion vector of a searched prediction unit in the image frame, and correct the current motion vector according to the motion vector of the searched prediction unit, to obtain the motion vector of the prediction unit of the second type.

16. The video motion estimation apparatus according to claim 15, wherein to obtain the motion vector of the prediction unit of the first type, the circuitry is further configured to:

obtain a first undetermined point in the prediction unit of the second type according to the second search algorithm;

obtain a polygonal model centered on the first undetermined point, and obtain a first target point according to the polygonal model in a case that a search step size of the first undetermined point is within a first preset step size threshold range;

move the polygonal model, and obtain an optimal point according to the moved polygonal model in a case that the first target point is inconsistent with the first undetermined point; and set a location of the optimal point as the current motion vector of the prediction unit of the second type unit in a case that the optimal point is consistent with the first target point.

17. The video motion estimation apparatus according to claim 14, wherein to obtain the motion vector of the prediction unit of the first type, the circuitry is further configured to:

obtain a second candidate starting search point corresponding to the prediction unit of the first type, calculate a rate-distortion cost of each second candidate starting search point, and set a second candidate starting search point with the minimum rate-distortion cost as a second starting search point;

obtain, according to the second preset increasing step size, a plurality of second candidate points within the search window range centered on the second starting search point, calculate a rate-distortion cost of each second candidate point, and select a point with the minimum rate-distortion cost from the plurality of second candidate points, to obtain a second undetermined point;

obtain a second supplementary point not searched around each point corresponding to the second preset step size, and calculate a rate-distortion cost of the second supplementary point in a case that the search step size corresponding to the second undetermined point is a second preset step size;

set a location of the second undetermined point as the motion vector of the prediction unit of the first type in a case that the point with the minimum rate-distortion cost in the second undetermined point and the second supplementary point is the second undetermined point; and set the second undetermined point as the second starting search point in a case that the point with the minimum rate-distortion cost in the second undetermined point and the second supplementary point is not the second undetermined point.

18. The video motion estimation apparatus according to claim 17, wherein to obtain the motion vector of the prediction unit of the first type, the circuitry is further configured to:

perform searching, according to a preset interval step size, within a preset range centered on the second undetermined point in a case that the search step size corresponding to the second undetermined point is within a third preset step size threshold range, to obtain a plurality of search points, and calculate a rate-distortion cost of each search point; and use the point with the minimum rate-distortion cost in the second undetermined point and the plurality of search points as the second starting search point.

19. The video motion estimation apparatus according to claim 16, wherein to move the polygonal model the circuitry is configured to:

move a center of the polygonal model to a location of the first target point in a case that the first target point is inconsistent with the first undetermined point; and select a point with minimum rate-distortion cost from the center of the moved polygonal model and each vertex, to obtain the optimal point.

20. A non-transitory computer-readable medium storing computer-readable instructions that, when executed by a processor, cause the processor to perform a method comprising:

dividing an image frame of a video into a plurality of prediction units, and dividing the plurality of prediction units into a first type of prediction units and a second type of prediction units;

obtaining a motion vector of a prediction unit of the first type according to a first search algorithm;

obtaining a motion vector of the prediction unit of the second type according to a second search algorithm, the second search algorithm being different from the first search algorithm; and performing sub-pixel motion estimation on the image frame according to the motion vector of the prediction unit of the first type and the motion vector of the prediction unit of the second type to generate a motion estimate result.

* * * * *